(12) United States Patent
Shimezawa

(10) Patent No.: US 11,496,890 B2
(45) Date of Patent: Nov. 8, 2022

(54) TERMINAL DEVICE, BASE STATION DEVICE, COMMUNICATION METHOD, AND STORAGE MEDIUM

(71) Applicant: Sony Corporation, Tokyo (JP)

(72) Inventor: Kazuyuki Shimezawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/492,943

(22) PCT Filed: Dec. 28, 2017

(86) PCT No.: PCT/JP2017/047347
§ 371 (c)(1),
(2) Date: Sep. 11, 2019

(87) PCT Pub. No.: WO2018/173416
PCT Pub. Date: Sep. 27, 2018

(65) Prior Publication Data
US 2020/0021976 A1  Jan. 16, 2020

(30) Foreign Application Priority Data

Mar. 22, 2017  (JP) .............................. JP2017-055349

(51) Int. Cl.
*H04W 8/30* (2009.01)
*H04W 68/00* (2009.01)
(Continued)

(52) U.S. Cl.
CPC ............. *H04W 8/30* (2013.01); *H04L 1/0063* (2013.01); *H04L 1/1819* (2013.01);
(Continued)

(58) Field of Classification Search
None
See application file for complete search history.

(56) References Cited

U.S. PATENT DOCUMENTS

| 10,581,483 B2* | 3/2020 | Yamamoto ............ H04W 72/04 |
| 2001/0021984 A1* | 9/2001 | Kim ........................ H04L 1/188 |
| | | 714/18 |

(Continued)

FOREIGN PATENT DOCUMENTS

| EP | 2 045 948 A2 | 4/2009 |
| JP | 9-224017 A | 8/1997 |

(Continued)

OTHER PUBLICATIONS

International Search Report and Written Opinion dated Mar. 27, 2018 for PCT/JP2017/047347 filed on Dec. 28, 2017, 18 pages including English Translation of the International Search Report.

(Continued)

*Primary Examiner* — Andrew C Oh
(74) *Attorney, Agent, or Firm* — Xsensus LLP

(57) ABSTRACT

To greatly improve transmission efficiency of an entire system by improving reliability while ensuring low delay with respect to notification of response information in a communication system in which a base station device and a terminal device communicate with each other.
A terminal device that communicates with a base station device, the terminal device including: a reception unit that receives a data channel including one or more pieces of data; and a transmission unit that transmits response information to the data on the basis of a parameter regarding reliability of the data.

12 Claims, 17 Drawing Sheets

(51) Int. Cl.
  *H04L 1/18* (2006.01)
  *H04L 1/00* (2006.01)
  *H04W 76/27* (2018.01)
  *H04W 72/04* (2009.01)
  *H04W 76/11* (2018.01)

(52) U.S. Cl.
  CPC ....... *H04W 68/005* (2013.01); *H04W 72/042* (2013.01); *H04W 76/11* (2018.02); *H04W 76/27* (2018.02)

(56) References Cited

U.S. PATENT DOCUMENTS

| | | | | |
|---|---|---|---|---|
| 2007/0041349 | A1* | 2/2007 | Kim | H04L 1/1671 370/335 |
| 2008/0095109 | A1* | 4/2008 | Malladi | H04L 1/1858 370/330 |
| 2009/0232101 | A1* | 9/2009 | Papasakellariou | H04L 5/0055 370/335 |
| 2009/0268844 | A1* | 10/2009 | Kinnunen | H04L 1/0029 375/295 |
| 2010/0311431 | A1* | 12/2010 | Papasakellariou | H04B 1/713 455/450 |
| 2011/0188381 | A1* | 8/2011 | Kim | H04B 7/2656 370/242 |
| 2011/0243066 | A1* | 10/2011 | Nayeb Nazar | H04L 5/0016 370/328 |
| 2011/0319068 | A1* | 12/2011 | Kim | H04W 72/0453 455/422.1 |
| 2012/0207040 | A1* | 8/2012 | Comsa | H04W 72/1215 370/252 |
| 2012/0307755 | A1* | 12/2012 | Kim | H04L 1/1825 370/329 |
| 2013/0083709 | A1* | 4/2013 | Ahn | H04W 72/02 370/280 |
| 2013/0163543 | A1* | 6/2013 | Freda | H04L 5/0041 370/329 |
| 2013/0294276 | A1* | 11/2013 | Cedergren | H04W 24/02 370/252 |
| 2013/0315089 | A1* | 11/2013 | Cedergren | H04L 1/20 370/252 |
| 2014/0098780 | A1* | 4/2014 | Kim | H04W 72/0413 370/329 |
| 2015/0131579 | A1* | 5/2015 | Li | H04L 1/189 370/329 |
| 2015/0289266 | A1* | 10/2015 | Hsu | H04W 72/1215 370/329 |
| 2016/0020873 | A1* | 1/2016 | Park | H04L 1/1854 370/336 |
| 2016/0143017 | A1* | 5/2016 | Yang | H04L 5/0053 370/329 |
| 2016/0226649 | A1* | 8/2016 | Papasakellariou | H04L 1/0001 |
| 2016/0242169 | A1* | 8/2016 | Park | H04L 1/1861 |
| 2016/0242176 | A1* | 8/2016 | Sun | H04W 72/0413 |
| 2016/0262182 | A1* | 9/2016 | Yang | H04L 1/1858 |
| 2016/0359591 | A1* | 12/2016 | Yellapantula | H04L 1/1812 |
| 2017/0171866 | A1* | 6/2017 | Cheng | H04W 72/0426 |
| 2017/0207894 | A1* | 7/2017 | Wang | H04L 1/1692 |
| 2017/0318575 | A1* | 11/2017 | Park | H04W 72/0446 |
| 2018/0241453 | A1* | 8/2018 | Lee | H04L 1/0028 |
| 2018/0287743 | A1* | 10/2018 | Byun | H04L 5/0073 |
| 2018/0309544 | A1* | 10/2018 | Hwang | H04W 72/12 |
| 2019/0013908 | A1* | 1/2019 | Xiong | H04L 27/2649 |
| 2019/0182824 | A1* | 6/2019 | Chatterjee | H04W 72/0413 |
| 2019/0223204 | A1* | 7/2019 | Kim | H04W 72/14 |
| 2020/0214024 | A1* | 7/2020 | Lee | H04B 7/0626 |

FOREIGN PATENT DOCUMENTS

| | | |
|---|---|---|
| JP | 2010-503291 A | 1/2010 |
| JP | 2012-530398 A | 11/2012 |
| JP | 2014-514842 A | 6/2014 |
| WO | 93/20632 A1 | 10/1993 |
| WO | 2008/020738 A1 | 2/2008 |
| WO | 2008/028006 A2 | 3/2008 |
| WO | 2010/027197 A2 | 3/2010 |
| WO | 2017/023906 A1 | 2/2017 |

OTHER PUBLICATIONS

3GPP, "3rd Generation Partnership Project; Technical Specification Group Radio Access Network; Study on Scenarios and Requirements for Next Generation Access Technologies", Release 14, 3GPP TR 38.913 V14.1.0, Dec. 2016, pp. 1-38.
3GPP, "3rd Generation Partnership Project; Technical Specification Group Radio Access Network; Evolved Universal Terrestrial Radio Access (E-UTRA); Physical layer procedures", Release 14, 3GPP TS 36.213 V14.1.0, Dec. 2016, pp. 1-414.
Supplementary European Search Report dated Feb. 28, 2020 in European Patent Application No. 17901500.3, 8 pages.
Japanese Office Action dated Dec. 14, 2021, in corresponding Japanese Patent Application No. 2019-507372, 12 pages.

* cited by examiner

FIG. 5

| | SUBCARRIER INTERVAL | MAXIMUM BANDWIDTH OF COMPONENT CARRIER | CP LENGTH TYPE | NUMBER OF SYMBOLS PER SUBFRAME | SUBFRAME LENGTH | RADIO FRAME LENGTH | NUMBER OF SUBCARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

TERMINAL DEVICE, BASE STATION DEVICE, COMMUNICATION METHOD, AND STORAGE MEDIUM

CROSS-REFERENCE TO RELATED APPLICATIONS

The present application is based on PCT filing PCT/JP2017/047347, filed Dec. 28, 2017, which claims priority to JP 2017-055349, filed Mar. 22, 2017, the entire contents of each are incorporated herein by reference.

TECHNICAL FIELD

The present disclosure relates to a terminal device, a base station device, a communication method, and a storage medium.

BACKGROUND ART

A radio access system and a radio network for cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") have been studied in the Third Generation Partnership Project (3GPP). Note that, in the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and as gNodeB in NR, and a terminal device (mobile station, mobile station device, terminal) is also referred to as User Equipment (UE). LTE and NR are cellular communication systems in which a plurality of areas covered by a base station device are arranged in a cell form. A single base station device may manage a plurality of cells.

NR is a radio access technology (RAT) different from LTE, as a next-generation radio access system for LTE. NR is an access technology that can cope with various use cases including enhanced mobile broadband (eMBB), massive machine type communications (mMTC), and ultra reliable and low latency communications (URLLC). NR is studied aiming at a technical framework coping with usage scenarios, requirements, and arrangement scenarios in those use cases. Details of scenarios and requirements in NR are disclosed in Non-Patent Document 1.

In particular, URLLC requires both high reliability and short delay. Repeating retransmission over time improves reliability but increases delay time. However, the delay time also includes the time taken to retransmit data in a case where the data is not correctly received. Therefore, reduction of the retransmission time is important for implementing low delay. Furthermore, for data retransmission, notification is essential of response information indicating whether the data is correctly received. Details of a notification method of the response information in LTE so far are disclosed in Non-Patent Document 2.

CITATION LIST

Non-Patent Document

Non-patent document 1: 3rd Generation Partnership Project; Technical Specification Group Radio Access Network; Study on Scenarios and Requirements for Next Generation Access Technologies; (Release 14), 3GPP TR 38.913 V14.1.0 (2016-12).

Non-patent document 2: 3rd Generation Partnership Project; Technical Specification Group Radio Access Network; Evolved Universal Terrestrial Radio Access (E-UTRA); Physical layer procedures (Release 14), 3GPP TS 36.213 V14.1.0 (2016-12)

SUMMARY OF THE INVENTION

Problems to be Solved by the Invention

However, even if data can be correctly received, in a case where notification of the response information cannot be correctly received, it is necessary to retransmit the data, so that the delay time is greatly affected. Therefore, to implement URLLC, a technology is required for implementing both reliability improvement and low delay for notification of the response information.

The present disclosure has been made in view of the above problem, and it is an object to provide a base station device, a terminal device, a communication system, a communication method, and a storage medium enabled to greatly improve transmission efficiency of the entire system by improving reliability while ensuring low delay with respect to notification of the response information in the communication system in which the base station device and the terminal device communicate with each other.

Solutions to Problems

According to the present disclosure, there is provided a terminal device that communicates with a base station device, the terminal device including: a reception unit that receives a data channel including one or more pieces of data; and a transmission unit that transmits response information to the data on the basis of a parameter regarding reliability of the data.

Furthermore, according to the present disclosure, there is provided a base station device that communicates with a terminal device, the base station device including: a transmission unit that transmits a data channel including one or more pieces of data; and a reception unit that receives response information to the data on the basis of a parameter regarding reliability of the data.

Furthermore, according to the present disclosure, there is provided a communication method used by a terminal device that communicates with a base station device, the communication method including: receiving a data channel including one or more pieces of data; and transmitting response information to the data on the basis of a parameter regarding reliability of the data.

Furthermore, according to the present disclosure, there is provided a communication method used by a base station device that communicates with a terminal device, the communication method including: transmitting a data channel including one or more pieces of data; and receiving response information to the data on the basis of a parameter regarding reliability of the data.

Furthermore, according to the present disclosure, there is provided a recording medium that records a program for causing a computer to function as: a reception unit that receives a data channel including one or more pieces of data; and a transmission unit that transmits response information to the data on the basis of a parameter regarding reliability of the data.

Furthermore, according to the present disclosure, there is provided a recording medium that records a program for causing a computer to function as: a transmission unit that transmits a data channel including one or more pieces of data; and a reception unit that receives response information to the data on the basis of a parameter regarding reliability of the data.

Effects of the Invention

As described above, according to the present disclosure, transmission efficiency can be greatly improved of the entire system by improving reliability while ensuring low delay with respect to notification of the response information in the communication system in which the base station device and the terminal device communicate with each other.

BRIEF DESCRIPTION OF DRAWINGS

FIG. 5 is a diagram illustrating an example of a parameter set regarding a transmission signal in an NR cell.

MODE FOR CARRYING OUT THE INVENTION

Figure 1:
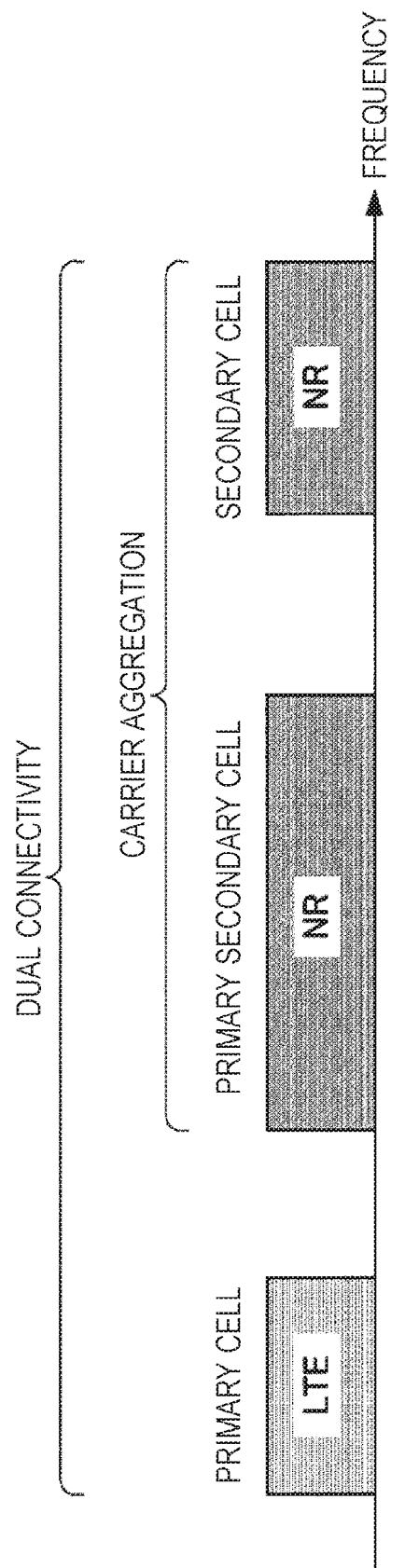
FIG. 1 is a diagram illustrating an example of a setting of a component carrier in the present embodiment.

Preferred embodiments of the present disclosure will be described in detail below with reference to the accompanying drawings. Note that, in the present description and the drawings, constituents having substantially the same functional configuration are denoted by the same reference signs, and redundant explanations will be omitted. Furthermore, unless otherwise stated, technologies, functions, methods, configurations, procedures, and all other descriptions described below can be applied to LTE and NR.

<Wireless Communication System in the Present Embodiment>

In the present embodiment, a wireless communication system includes at least a base station device 1 and a terminal device 2. The base station device 1 can accommodate a plurality of terminal devices. The base station device 1 can be connected to another base station device by means of an X2 interface. Furthermore, the base station device 1 can be connected to an Evolved Packet Core (EPC) by means of an S1 interface. Moreover, the base station device 1 can be connected to a Mobility Management Entity (MME) by means of an S1-MME interface, and can be connected to a Serving Gateway (S-GW) by means of an S1-U interface. The S1 interface supports many-to-many connection between the MME and/or S-GW and the base station device 1. Furthermore, in the present embodiment, the base station device 1 and the terminal device 2 each support LTE and/or NR.

<Radio Access Technology in the Present Embodiment>

In the present embodiment, the base station device 1 and the terminal device 2 each support one or more radio access technologies (RATs). For example, the RAT includes LTE and NR. One RAT corresponds to one cell (component carrier). In other words, in a case where a plurality of RATs is supported, those RATs respectively correspond to different cells. In the present embodiment, a cell is a combination of a downlink resource, an uplink resource, and/or a sidelink. Furthermore, in the following description, a cell corresponding to LTE is referred to as an LTE cell, and a cell corresponding to NR is referred to as an NR cell.

Downlink communication is communication from the base station device 1 to the terminal device 2. Downlink transmission is transmission from the base station device 1 to the terminal device 2, and is transmission of a downlink physical channel and/or a downlink physical signal. Uplink communication is communication from the terminal device 2 to the base station device 1. Uplink transmission is transmission from the terminal device 2 to the base station device 1, and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for proximity direct detection and proximity direct communication between terminal devices. The sidelink communication can use a frame configuration similar to that of the uplink and downlink. Furthermore, the sidelink communication can be limited to part (subset) of the uplink resource and/or the downlink resource.

The base station device 1 and the terminal device 2 can support communication using a set of one or more cells in the downlink, uplink and/or sidelink. A set of a plurality of cells is also referred to as carrier aggregation or dual connectivity. Details of the carrier aggregation and dual connectivity will be described later. Furthermore, each cell uses a predetermined frequency bandwidth. The maximum value, the minimum value, and a settable value in the predetermined frequency bandwidth can be defined in advance.

FIG. 1 is a diagram illustrating an example of a setting of the component carrier in the present embodiment. In the example of FIG. 1, one LTE cell and two NR cells are set. The one LTE cell is set as a primary cell. The two NR cells are set as a primary secondary cell and a secondary cell, respectively. The two NR cells are integrated together by carrier aggregation. Furthermore, the LTE cell and the NR cells are integrated together by dual connectivity. Note that, the LTE cell and the NR cells may be integrated together by carrier aggregation. In the example of FIG. 1, since NR can be assisted in connection by the LTE cell that is a primary cell, it does not have to support some functions like a function for communicating in a stand-alone manner. The function for communicating in a stand-alone manner includes a function required for initial connection.

Figure 2:
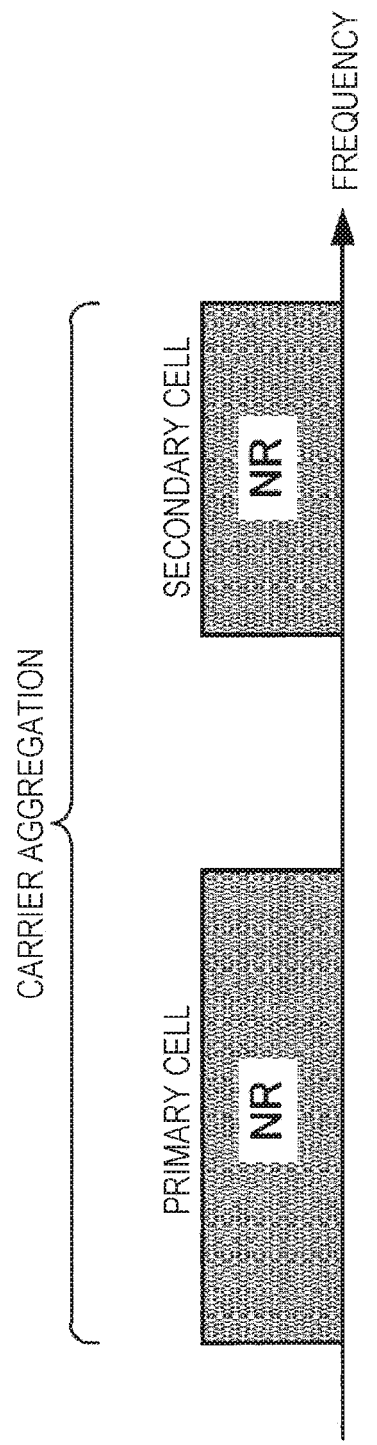
FIG. 2 is a diagram illustrating an example of the setting of the component carrier in the present embodiment.

FIG. 2 is a diagram illustrating an example of the setting of the component carrier in the present embodiment. In the example of FIG. 2, two NR cells are set. The two NR cells are set as a primary cell and a secondary cell, respectively, and are integrated together by carrier aggregation. In this case, the NR cells support the function for communicating in a stand-alone manner, whereby the assist by the LTE cell is not necessary. Note that, the two NR cells may be integrated together by dual connectivity.

<Radio Frame Configuration in the Present Embodiment>

In the present embodiment, a radio frame configured in 10 ms (milliseconds) is defined. Each radio frame includes two half frames. The half frame time interval is 5 ms. Each half frame includes five subframes. The subframe time interval is 1 ms and is defined by two consecutive slots. The slot time interval is 0.5 ms. The i-th subframe in the radio frame includes a (2×i)-th slot and a (2×i+1)-th slot. That is, ten subframes are defined in each radio frame.

The subframe includes a downlink subframe, an uplink subframe, a special subframe, a sidelink subframe, and the like.

The downlink subframe is a subframe reserved for downlink transmission. The uplink subframe is a subframe reserved for uplink transmission. The special subframe includes three fields. The three fields include a Downlink Pilot Time Slot (DwPTS), a Guard Period (GP), and an Uplink Pilot Time Slot (UpPTS). The total length of the DwPTS, GP, and UpPTS is 1 ms. The DwPTS is a field reserved for downlink transmission. The UpPTS is a field reserved for uplink transmission. The GP is a field in which downlink transmission and uplink transmission are not performed. Note that, the special subframe may include only the DwPTS and GP, or may include only the GP and UpPTS. The special subframe is arranged between the downlink subframe and the uplink subframe in TDD, and is used to switch from the downlink subframe to the uplink subframe. The sidelink subframe is a subframe reserved or set for sidelink communication. The sidelink is used for proximity direct communication and proximity direct detection between terminal devices.

A single radio frame includes the downlink subframe, the uplink subframe, the special subframe and/or the sidelink subframe. Furthermore, the single radio frame may include only the downlink subframe, the uplink subframe, the special subframe, or the sidelink subframe.

A plurality of radio frame configurations is supported. Each of the radio frame configurations is defined by a frame configuration type. Frame configuration type 1 is applicable only to FDD. Frame configuration type 2 is applicable only to TDD. Frame configuration type 3 is applicable only to operation of a Licensed Assisted Access (LAA) secondary cell.

In the frame configuration type 2, a plurality of uplink-downlink configurations is defined. In the uplink-downlink configuration, each of ten subframes in one radio frame corresponds to any of the downlink subframe, the uplink subframe, and the special subframe. A subframe 0, a subframe 5, and the DwPTS are always reserved for downlink transmission. The UpPTS and a subframe immediately after the UpPTS's special subframe are always reserved for uplink transmission.

In the frame configuration type 3, ten subframes in one radio frame are reserved for downlink transmission. The terminal device 2 can treat a subframe on which a PDSCH or detection signal is not transmitted, as an empty subframe. Unless a predetermined signal, channel and/or downlink transmission is detected in a subframe, the terminal device 2 assumes that no signal and/or channel exists in the subframe. Downlink transmission is occupied by one or a plurality of consecutive subframes. The first subframe of the downlink transmission may be started from anywhere within the subframe. The last subframe of the downlink transmission may either be completely occupied or be occupied at a time interval defined by the DwPTS.

Note that, in the frame configuration type 3, ten subframes in one radio frame may be reserved for uplink transmission. Furthermore, each of ten subframes in one radio frame may correspond to any of the downlink subframe, the uplink subframe, the special subframe, and the sidelink subframe.

The base station device 1 may transmit the downlink physical channel and the downlink physical signal in the DwPTS of the special subframe. The base station device 1 can limit transmission of a PBCH in the DwPTS of the special subframe. The terminal device 2 may transmit the uplink physical channel and the uplink physical signal in the UpPTS of the special subframe. The terminal device 2 can limit transmission of some uplink physical channels and uplink physical signals in the UpPTS of the special subframe.

Note that, a time interval in one transmission is referred to as a Transmission Time Interval (TTI), and in LTE, 1 ms (one subframe) is defined as 1 TTI.

<Frame Configuration of LTE in the Present Embodiment>

Figure 3:
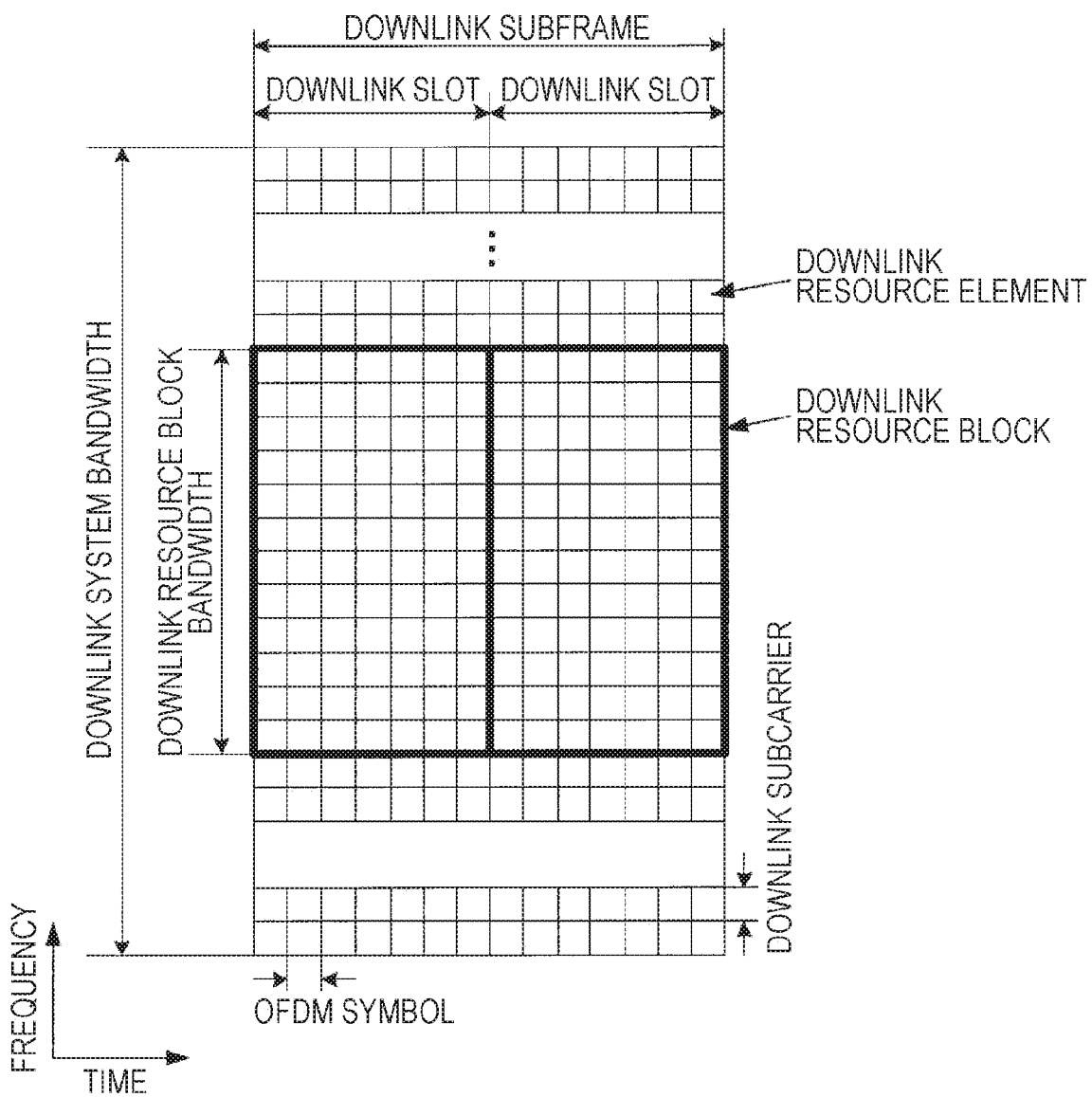
FIG. 3 is a diagram illustrating an example of a downlink subframe of LTE in the present embodiment.

FIG. 3 is a diagram illustrating an example of a downlink subframe of LTE in the present embodiment. The diagram illustrated in FIG. 3 is also referred to as a downlink resource grid of LTE. The base station device 1 can transmit a downlink physical channel of LTE and/or a downlink physical signal of LTE in the downlink subframe to the terminal device 2. The terminal device 2 can receive a downlink physical channel of LTE and/or a downlink physical signal of LTE in the downlink subframe from the base station device 1.

Figure 4:
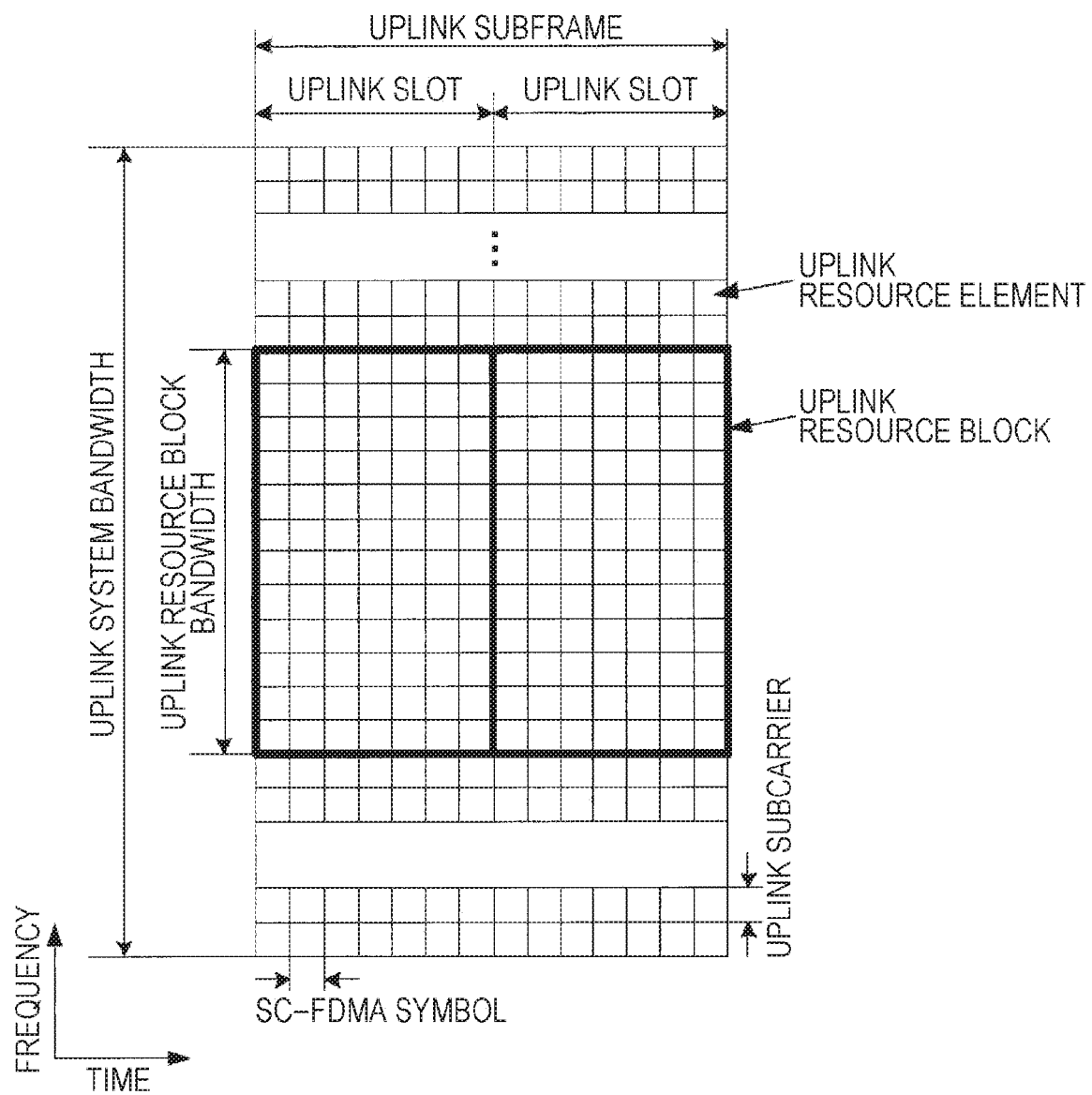
FIG. 4 is a diagram illustrating an example of an uplink subframe of LTE in the present embodiment.

FIG. 4 is a diagram illustrating an example of an uplink subframe of LTE in the present embodiment. The diagram illustrated in FIG. 4 is also referred to as an uplink resource grid of LTE. The terminal device 2 can transmit an uplink physical channel of LTE and/or an uplink physical signal of LTE in the uplink subframe to the base station device 1. The base station device 1 can receive an uplink physical channel of LTE and/or an uplink physical signal of LTE in the uplink subframe from the terminal device 2.

In the present embodiment, a physical resource of LTE can be defined as follows. One slot is defined by a plurality of symbols. The physical signal or physical channel transmitted in each slot is represented by a resource grid. In the downlink, the resource grid is defined by a plurality of subcarriers in the frequency direction and a plurality of OFDM symbols in the time direction. In the uplink, the resource grid is defined by a plurality of subcarriers in the frequency direction and a plurality of SC-FDMA symbols in the time direction. The number of subcarriers or resource blocks may be determined depending on the bandwidth of the cell. The number of symbols in one slot is determined by a type of a Cyclic Prefix (CP). The type of the CP is a normal CP or an extended CP. In the normal CP, the number of OFDM symbols or SC-FDMA symbols constituting one slot is seven. In the extended CP, the number of OFDM symbols or SC-FDMA symbols constituting one slot is six. Each of elements in the resource grid is referred to as a resource element. The resource element is identified by using a subcarrier index (number) and a symbol index (number). Note that, in the description of the present embodiment, the OFDM symbol or SC-FDMA symbol is also simply referred to as a symbol.

The resource block is used to map a certain physical channel (such as the PDSCH or PUSCH) onto a resource element. The resource block includes a virtual resource block and a physical resource block. A certain physical channel is mapped onto a virtual resource block. The virtual resource block is mapped onto a physical resource block. One physical resource block is defined by a predetermined number of consecutive symbols in the time domain. One physical resource block is defined by a predetermined number of consecutive subcarriers in the frequency domain. The number of symbols and the number of subcarriers in one physical resource block are determined on the basis of the type of the CP in the cell, subcarrier interval, and/or a parameter set by an upper layer, and the like. For example, in a case where the type of the CP is the normal CP and the subcarrier interval is 15 kHz, the number of symbols in one physical resource block is 7 and the number of subcarriers is 12. In that case, one physical resource block includes (7×12) resource elements. Physical resource blocks are numbered from zero in the frequency domain. Furthermore, two resource blocks in one subframe corresponding to the same physical resource block number are defined as a physical resource block pair (PRB pair, RB pair).

In each LTE cell, one predetermined parameter is used in a certain subframe. For example, the predetermined parameter is a parameter (physical parameter) regarding a transmission signal. The parameter regarding the transmission signal includes the CP length, subcarrier interval, number of symbols in one subframe (predetermined time length), number of subcarriers in one resource block (predetermined frequency band), multiple access method, signal waveform, and the like.

In other words, in the LTE cell, a downlink signal and an uplink signal each are generated by using one predetermined parameter in a predetermined time length (for example, subframe). In other words, the terminal device 2 assumes that the downlink signal transmitted from the base station device 1 and the uplink signal transmitted to the base station device 1 each are generated with one predetermined parameter in the predetermined time length. Furthermore, the base station device 1 performs setting so that the downlink signal transmitted to the terminal device 2 and the uplink signal transmitted from the terminal device 2 each are generated with one predetermined parameter in the predetermined time length.

<Frame Configuration of NR in the Present Embodiment>

In each NR cell, one or more predetermined parameters are used in a predetermined time length (for example, subframe, slot, mini-slot, symbol, radio frame). In other words, in the NR cell, a downlink signal and an uplink signal each are generated by using one or more predetermined parameters in the predetermined time length. In other words, the terminal device 2 assumes that the downlink signal transmitted from the base station device 1 and the uplink signal transmitted to the base station device 1 each are generated with one or more predetermined parameters in the predetermined time length. Furthermore, the base station device 1 can perform setting so that the downlink signal transmitted to the terminal device 2 and the uplink signal transmitted from the terminal device 2 each are generated with one or more predetermined parameters in the predetermined time length. In a case where a plurality of predetermined parameters is used, signals generated by using those predetermined parameters are multiplexed by a predetermined method. For example, the predetermined method includes Frequency Division Multiplexing (FDM), Time Division Multiplexing (TDM), Code Division Multiplexing (CDM), and/or Spatial Division Multiplexing (SDM), and the like.

For a combination of the predetermined parameters set in the NR cell, a plurality of types can be defined in advance as a parameter set.

FIG. 5 is a diagram illustrating an example of the parameter set regarding a transmission signal in the NR cell. In the example of FIG. 5, parameters regarding the transmission signal included in the parameter set are the subcarrier interval, the number of subcarriers per resource block in the NR cell, the number of symbols per subframe, and the CP length type. The CP length type is a type of the CP length used in the NR cell. For example, CP length type 1 corresponds to the normal CP in LTE, and CP length type 2 corresponds to the extended CP in LTE.

The parameter set regarding the transmission signal in the NR cell can be defined individually for the downlink and uplink. Furthermore, the parameter set regarding the transmission signal in the NR cell can be set independently for the downlink and uplink.

Figure 6:
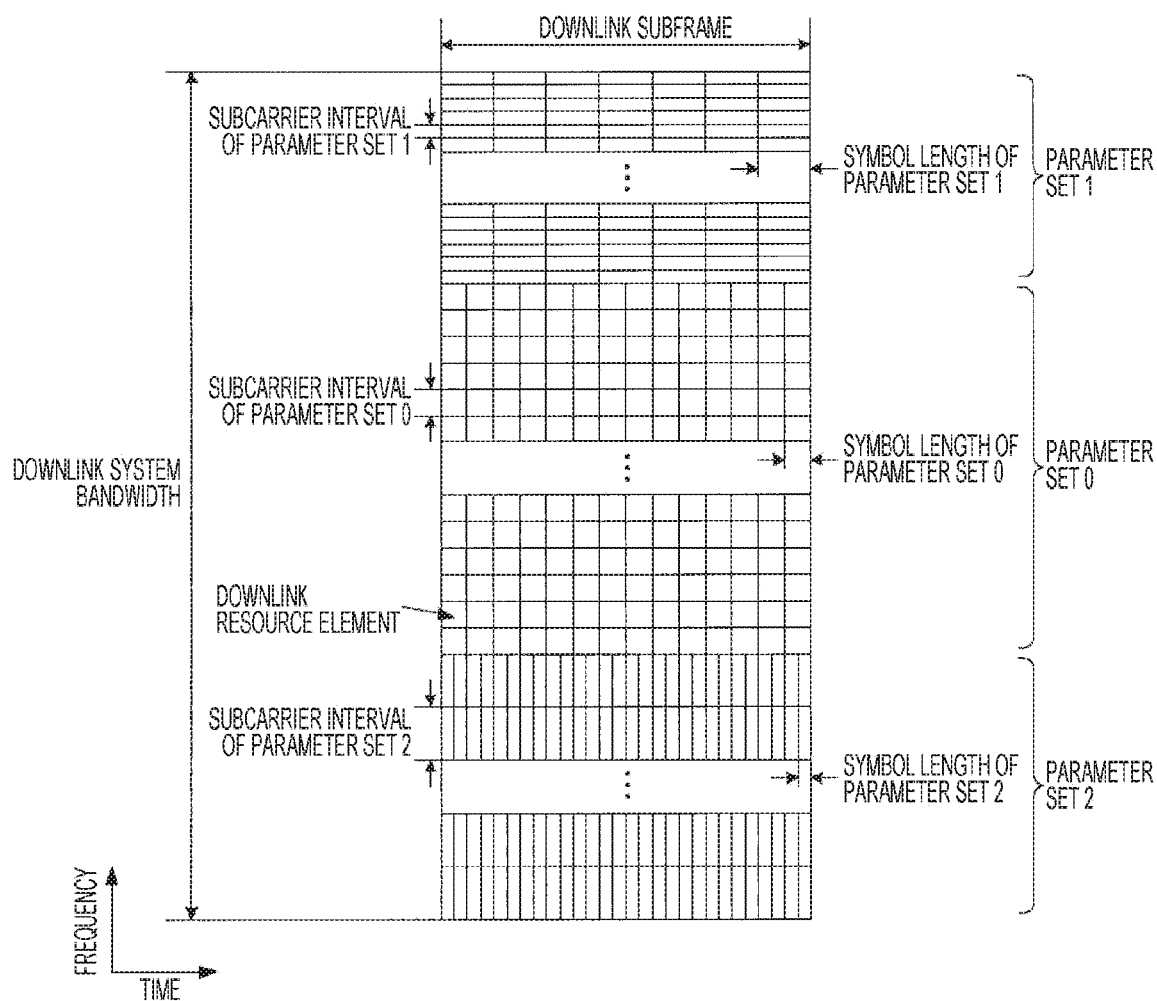
FIG. 6 is a diagram illustrating an example of a downlink subframe of NR in the present embodiment.

FIG. 6 is a diagram illustrating an example of a downlink subframe of NR in the present embodiment. In the example of FIG. 6, signals generated by using a parameter set 1, a parameter set 0, and a parameter set 2 are subjected to FDM in the cell (system bandwidth). The diagram illustrated in FIG. 6 is also referred to as a downlink resource grid of NR. The base station device 1 can transmit a downlink physical channel of NR and/or a downlink physical signal of NR in the downlink subframe to the terminal device 2. The terminal device 2 can receive the downlink physical channel of NR and/or the downlink physical signal of NR in the downlink subframe from the base station device 1.

Figure 7:
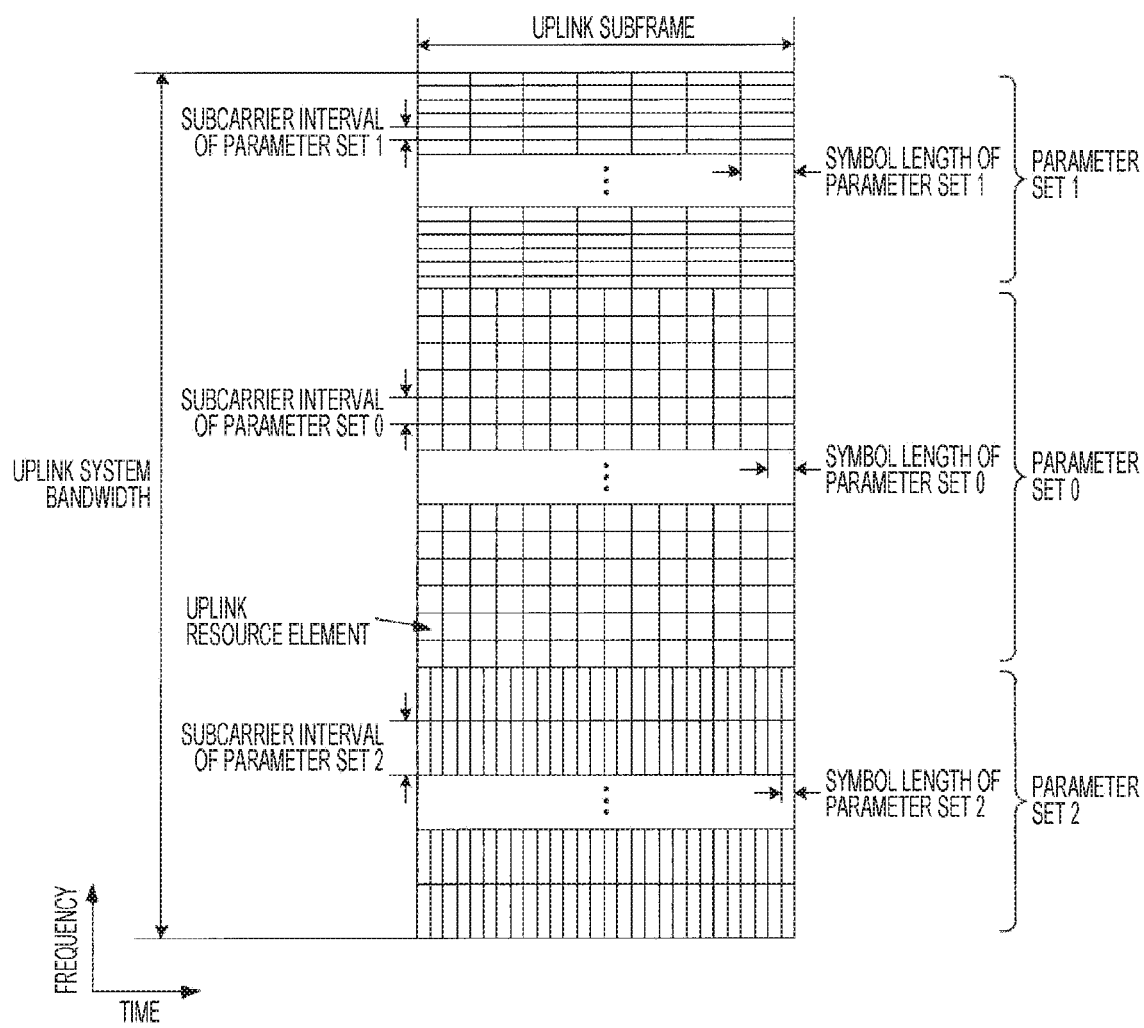
FIG. 7 is a diagram illustrating an example of an uplink subframe of NR in the present embodiment.

FIG. 7 is a diagram illustrating an example of an uplink subframe of NR in the present embodiment. In the example of FIG. 7, signals generated by using the parameter set 1, the parameter set 0, and the parameter set 2 are subjected to FDM in the cell (system bandwidth). The diagram illustrated in FIG. 6 is also referred to as an uplink resource grid of NR. The base station device 1 can transmit an uplink physical channel of NR and/or an uplink physical signal of NR in the uplink subframe to the terminal device 2. The terminal device 2 can receive an uplink physical channel of NR and/or an uplink physical signal of NR in the uplink subframe from the base station device 1.

Furthermore, in NR, the subframe, slot, and mini-slot are defined as units in the time direction.

The subframe has a time interval of 1 ms and includes 14 symbols at a predetermined subcarrier interval (for example, 15 kHz). Note that, the subframe may be defined by a predetermined number of symbols, and the subframe length in that case is variable depending on the subcarrier interval.

The slot can be defined as a processing unit in the time direction to which data or the like is allocated. The slot includes a predetermined number of symbols, and is set uniquely for the base station, cell and/or terminal. For example, the slot includes 7 or 14 symbols.

Similarly to the slot, the mini-slot can be defined as a processing unit in the time direction to which data or the like is allocated. However, the mini-slot includes fewer symbols than the number of symbols constituting the slot. Furthermore, a possible value of the number of symbols constituting the mini-slot may be changed depending on the carrier frequency. In the case of a predetermined carrier frequency (for example, 6 GHz) or higher, the minimum value of the number of symbols constituting the mini-slot is one, and in the case of less than the predetermined carrier frequency (for example 6 GHz), the minimum value of the number of symbols constituting the mini-slot is two. Note that, the mini-slot may be used as part of the slot.

<Antenna Port in the Present Embodiment>

An antenna port is defined to allow a propagation channel carrying a certain symbol to be inferred from a propagation channel carrying another symbol at the same antenna port. For example, it can be assumed that different physical resources in the same antenna port are transmitted on the same propagation channel. In other words, a symbol at a certain antenna port can be demodulated by estimating a propagation channel with a reference signal at the antenna port. Furthermore, there is one resource grid for each antenna port. The antenna port is defined by the reference signal. Furthermore, each reference signal can define a plurality of antenna ports.

The antenna port is specified or identified by an antenna port number. For example, antenna ports 0 to 3 are antenna ports on which CRSs are transmitted. In other words, PDSCHs transmitted on the antenna ports 0 to 3 can be demodulated by CRSs corresponding to the antenna ports 0 to 3.

Two antenna ports can be expressed as quasi co-location (QCL) in a case where a predetermined condition is satisfied. The predetermined condition is that global characteristics of a propagation channel carrying a symbol at a certain antenna port can be inferred from a propagation channel carrying a symbol at another antenna port. The global characteristics include delay dispersion, Doppler spread, Doppler shift, average gain, and/or average delay.

In the present embodiment, the antenna port number may be defined differently for each RAT, or may be commonly defined among RATs. For example, the antenna ports 0 to 3 in LTE are antenna ports on which CRSs are transmitted. In NR, the antenna ports 0 to 3 can be antenna ports on which CRSs similar to those in LTE are transmitted. Furthermore, in NR, an antenna port on which a CRS similar to that of LTE is transmitted can be an antenna port number different from the antenna ports 0 to 3. In the description of the present embodiment, a predetermined antenna port number can be applied to LTE and/or NR.

<Physical Channel and Physical Signal in the Present Embodiment>

In the present embodiment, a physical channel and a physical signal are used.

The physical channel includes a downlink physical channel, an uplink physical channel, and a sidelink physical channel. The physical signal includes a downlink physical signal, an uplink physical signal, and a sidelink physical signal.

The physical channel and the physical signal in LTE are also referred to as an LTE physical channel and an LTE physical signal, respectively. The physical channel and physical signal in NR are also referred to as an NR physical channel and an NR physical signal, respectively. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as a physical channel, and the LTE physical signal and the NR physical signal are also simply referred to as a physical signal. In other words, the description for the physical channel is applicable to both the LTE physical channel and the NR physical channel. The description for the physical signal is applicable to both the LTE physical signal and the NR physical signal.

<NR Physical Channel and NR Physical Signal in the Present Embodiment>

The descriptions for the physical channel and physical signal in LTE are also applicable to the NR physical channel and NR physical signal, respectively. The NR physical channel and the NR physical signal are referred to as follows.

An NR downlink physical channel includes an NR-PBCH, NR-PCFICH, NR-PHICH, NR-PDCCH, NR-EPDCCH, NR-MPDCCH, NR-R-PDCCH, NR-PDSCH, NR-PMCH, and the like.

An NR downlink physical signal includes an NR-SS, NR-DL-RS, NR-DS, and the like. The NR-SS includes an NR-PSS, NR-SSS, and the like. The NR-RS includes NR-CRS, NR-PDSCH-DMRS, NR-EPDCCH-DMRS, NR-PRS, NR-CSI-RS, NR-TRS, and the like.

An NR uplink physical channel includes an NR-PUSCH, NR-PUCCH, NR-PRACH, and the like.

An NR uplink physical signal includes an NR-UL-RS. The NR-UL-RS includes an NR-UL-DMRS, NR-SRS, and the like.

An NR sidelink physical channel includes an NR-PSBCH, NR-PSCCH, NR-PSDCH, NR-PSSCH, and the like.

<Downlink Physical Channel in the Present Embodiment>

The PBCH is used to broadcast a Master Information Block (MIB) that is broadcast information unique to a serving cell of the base station device 1. The PBCH is transmitted only in the subframe 0 in the radio frame. The MIB can be updated at intervals of 40 ms. The PBCH is repeatedly transmitted in a 10 ms period. Specifically, initial transmission of the MIB is performed in the subframe 0 in a radio frame that satisfies a condition that a remainder obtained by dividing a System Frame Number (SFN) by four is zero, and retransmission (repetition) of the MIB is performed in the subframe 0 in all other radio frames. The SFN is a radio frame number (system frame number). The MIB is system information. For example, the MIB includes information indicating the SFN.

The PCFICH is used to transmit information regarding the number of OFDM symbols used for transmission of the PDCCH. A region indicated by the PCFICH is also referred to as a PDCCH region. Information transmitted on the PCFICH is also referred to as a Control Format Indicator (CFI).

The PHICH is used to transmit HARQ-ACK (HARQ indicator, HARQ feedback, response information) indicating acknowledgement (ACK) or negative acknowledgement (NACK) for uplink data (Uplink Shared Channel: UL-SCH) received by the base station device 1. For example, in a case where the terminal device 2 receives HARQ-ACK indicating ACK, the corresponding uplink data is not retransmitted. For example, in a case where the terminal device 2 receives HARQ-ACK indicating NACK, the terminal device 2 retransmits the corresponding uplink data in a predetermined uplink subframe. A certain PHICH transmits HARQ-ACK for certain uplink data. The base station device 1 transmits each piece of HARQ-ACK for a plurality of pieces of uplink data included in the same PUSCH by using a plurality of PHICHs.

The PDCCH and the EPDCCH are used to transmit Downlink Control Information (DCI). Mapping of an information bit of the downlink control information is defined as a DCI format. The downlink control information includes a downlink grant and an uplink grant. The downlink grant is also referred to as downlink assignment or downlink allocation.

The PDCCH is transmitted by a set of one or a plurality of consecutive Control Channel Elements (CCEs). The CCE includes nine Resource Element Groups (REGs). The REG includes four resource elements. In a case where a PDCCH includes n consecutive CCEs, the PDCCH starts from a CCE that satisfies a condition that a remainder obtained by dividing i that is an index (number) of the CCE is zero.

The EPDCCH is transmitted by a set of one or a plurality of consecutive enhanced control channel elements (ECCEs). The ECCE includes a plurality of Enhanced Resource Element Groups (EREGs).

The downlink grant is used for scheduling of the PDSCH in a certain cell. The downlink grant is used for scheduling of the PDSCH in the same subframe as a subframe on which the downlink grant is transmitted. The uplink grant is used for scheduling of the PUSCH in a certain cell. The uplink grant is used for scheduling of a single PUSCH in a subframe after four or more subframes from a subframe on which the uplink grant is transmitted.

In the DCI, a cyclic redundancy check (CRC) parity bit is added. The CRC parity bit is scrambled with a Radio Network Temporary Identifier (RNTI). The RNTI is an identifier that can be defined or set depending on a purpose of the DCI, and the like. The RNTI is an identifier defined in advance in a specification, an identifier set as information unique to a cell, an identifier set as information unique to the terminal device 2, or an identifier set as information unique to a group belonging to the terminal device 2. For example, in monitoring of the PDCCH or EPDCCH, the terminal device 2 descrambles the CRC parity bit added to the DCI with a predetermined RNTI, to identify whether the CRC is correct. In a case where the CRC is correct, it is known that the DCI is for the terminal device 2.

The PDSCH is used to transmit downlink data (Downlink Shared Channel: DL-SCH). Furthermore, the PDSCH is also used to transmit control information of the upper layer.

The PMCH is used to transmit multicast data (Multicast Channel: MCH).

In the PDCCH region, a plurality of PDCCHs may be frequency, time, and/or spatially multiplexed. In an EPDCCH region, a plurality of EPDCCHs may be frequency, time, and/or spatially multiplexed. In a PDSCH region, a plurality of PDSCHs may be frequency, time, and/or spatially multiplexed. The PDCCH, PDSCH and/or EPDCCH may be frequency, time, and/or spatially multiplexed.

<Downlink Physical Signal in the Present Embodiment>

A synchronization signal is used by the terminal device 2 for synchronization in the downlink frequency domain and/or time domain. The synchronization signal includes a Primary Synchronization Signal (PSS) and a Secondary Synchronization Signal (SSS). The synchronization signal is arranged in a predetermined subframe in the radio frame. For example, in a TDD system, the synchronization signal is arranged in subframes 0, 1, 5, and 6 in the radio frame. In an FDD system, the synchronization signal is arranged in subframes 0 and 5 in the radio frame.

The PSS may be used for coarse frame/symbol timing synchronization (synchronization in time domain) and for identification of a cell identification group. The SSS may be used for more accurate frame timing synchronization, cell identification, and CP length detection. That is, frame timing synchronization and cell identification can be performed by use of the PSS and SSS.

A downlink reference signal is used by the terminal device 2 to perform propagation path estimation of the downlink physical channel, propagation path correction, calculation of downlink Channel State Information (CSI), and/or measurement of positioning of the terminal device 2.

The CRS is transmitted on the entire band of the subframe. The CRS is used to receive (demodulate) the PBCH, PDCCH, PHICH, PCFICH, and PDSCH. The CRS may be used by the terminal device 2 to calculate the downlink channel state information. The PBCH, PDCCH, PHICH, and PCFICH are transmitted on an antenna port used for transmission of the CRS. The CRS supports a configuration of one, two, or four antenna ports. The CRS is transmitted on one or a plurality of the antenna ports 0 to 3.

A URS associated with the PDSCH is transmitted on the subframe and band used for transmission of the PDSCH with which the URS is associated. The URS is used to demodulate the PDSCH with which the URS is associated. The URS associated with the PDSCH is transmitted on one or a plurality of antenna ports 5, and 7 to 14.

The PDSCH is transmitted on an antenna port used for transmission of the CRS or URS on the basis of a transmission mode and a DCI format. The DCI format 1A is used for scheduling of the PDSCH transmitted on the antenna port used for transmission of the CRS. The DCI format 2D is used for scheduling of the PDSCH transmitted on an antenna port used for transmission of the URS.

The DMRS associated with the EPDCCH is transmitted on the subframe and band used for transmission of the EPDCCH with which the DMRS is associated. The DMRS is used to demodulate the EPDCCH with which the DMRS is associated. The EPDCCH is transmitted on an antenna port used for transmission of the DMRS. The DMRS associated with the EPDCCH is transmitted on one or a plurality of antenna ports 107 to 114.

The CSI-RS is transmitted on a set subframe. The resource on which the CSI-RS is transmitted is set by the base station device 1. The CSI-RS is used by the terminal device 2 to calculate downlink channel state information. The terminal device 2 performs signal measurement (channel measurement) by using the CSI-RS. The CSI-RS supports setting of some or all of 1, 2, 4, 8, 12, 16, 24, and 32 antenna ports. The CSI-RS is transmitted on one or a plurality of antenna ports 15 to 46. Note that, an antenna port to be supported may be determined on the basis of terminal device capability of the terminal device 2, a setting of an RRC parameter, and/or a transmission mode to be set, and the like.

A ZP CSI-RS resource is set by the upper layer. The ZP CSI-RS resource may be transmitted with zero output power. In other words, the ZP CSI-RS resource may transmit nothing. On the resource set by the ZP CSI-RS, the PDSCH and EPDCCH are not transmitted. For example, the ZP CSI-RS resource is used by a neighboring cell to transmit an NZP CSI-RS. Furthermore, for example, the ZP CSI-RS resource is used to measure CSI-IM. Furthermore, for example, the ZP CSI-RS resource is a resource on which a predetermined channel such as the PDSCH is not transmitted. In other words, the predetermined channel is mapped (rate matched and punctured) except for the ZP CSI-RS resource.

<Uplink Physical Channel in the Present Embodiment>

The PUCCH is a physical channel used to transmit uplink control information (UCI). The uplink control information includes downlink channel state information (CSI), a scheduling request (SR) indicating a request for a PUSCH resource, and HARQ-ACK for downlink data (transport block: TB, downlink-shared channel: DL-SCH). The HARQ-ACK is also referred to as ACK/NACK, HARQ feedback, or response information. Furthermore, the HARQ-ACK for downlink data indicates ACK, NACK or DTX.

The PUSCH is a physical channel used to transmit uplink data (Uplink-Shared Channel: UL-SCH). Furthermore, the PUSCH may be used to transmit the HARQ-ACK and/or the channel state information along with the uplink data. Furthermore, the PUSCH may be used to transmit only the channel state information or only the HARQ-ACK and channel state information.

The PRACH is a physical channel used to transmit a random access preamble. The PRACH can be used for the terminal device 2 to synchronize with the base station device 1 in the time domain. Furthermore, the PRACH is also used to indicate an initial connection establishment procedure (processing), a handover procedure, a connection re-establishment procedure, synchronization for uplink transmission (timing adjustment), and/or the request for the PUSCH resource.

In a PUCCH region, a plurality of PUCCHs is frequency, time, space, and/or code multiplexed. In the PUSCH region, a plurality of PUSCHs may be frequency, time, space, and/or code multiplexed. The PUCCH and PUSCH may be frequency, time, space, and/or code multiplexed. The PRACH may be arranged in a single subframe or over two subframes. A plurality of PRACHs may be code-multiplexed.

<Configuration Example of Base Station Device 1 in the Present Embodiment>

Figure 8:
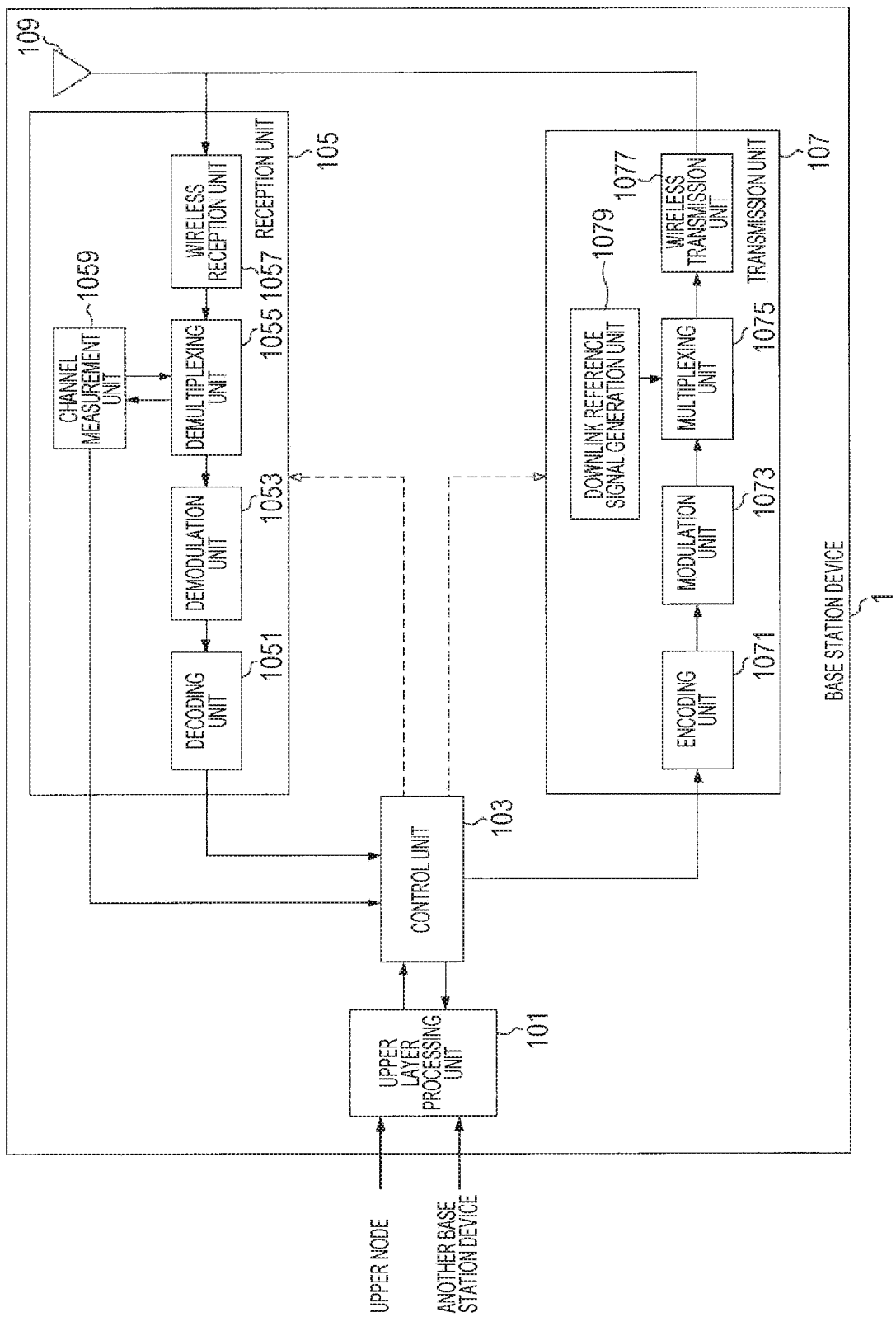
FIG. 8 is a schematic block diagram illustrating a configuration of a base station device 1 of the present embodiment.

FIG. 8 is a schematic block diagram illustrating a configuration of the base station device 1 of the present embodiment. As illustrated, the base station device 1 includes an upper layer processing unit 101, a control unit 103, a reception unit 105, a transmission unit 107, and a transmission/reception antenna 109. Furthermore, the reception unit 105 includes a decoding unit 1051, a demodulation unit 1053, a demultiplexing unit 1055, a wireless reception unit 1057, and a channel measurement unit 1059. Furthermore, the transmission unit 107 includes an encoding unit 1071, a modulation unit 1073, a multiplexing unit 1075, a wireless transmission unit 1077, and a downlink reference signal generation unit 1079.

As described above, the base station device 1 can support one or more RATs. Some or all of the units included in the base station device 1 illustrated in FIG. 8 can be individually configured depending on the RAT. For example, the reception unit 105 and the transmission unit 107 are individually configured for LTE and NR. Furthermore, in the NR cell, some or all of the units included in the base station device 1 illustrated in FIG. 8 can be individually configured depending on the parameter set regarding the transmission signal. For example, in a certain NR cell, the wireless reception unit 1057 and the wireless transmission unit 1077 can be individually configured depending on the parameter set regarding the transmission signal.

The upper layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the upper layer processing unit 101 generates control information to control the reception unit 105 and the transmission unit 107, and outputs the control information to the control unit 103.

The control unit 103 controls the reception unit 105 and the transmission unit 107 on the basis of the control information from the upper layer processing unit 101. The control unit 103 generates control information to the upper layer processing unit 101, and outputs the control information to the upper layer processing unit 101. The control unit 103 inputs a decoded signal from the decoding unit 1051 and a channel estimation result from the channel measurement unit 1059. The control unit 103 outputs a signal to be encoded to the encoding unit 1071. Furthermore, the control unit 103 is used to control the whole or part of the base station device 1.

The upper layer processing unit 101 performs processing and management regarding RAT control, radio resource control, subframe setting, scheduling control, and/or CSI report control. The processing and management in the upper layer processing unit 101 are performed for each terminal device or commonly for terminal devices connected to the base station device. The processing and management in the upper layer processing unit 101 may be performed only in the upper layer processing unit 101, or may be acquired from an upper node or another base station device. Furthermore, the processing and management in the upper layer processing unit 101 may be performed individually depending on the RAT. For example, the upper layer processing unit 101 individually performs processing and management in LTE and processing and management in NR.

In the RAT control in the upper layer processing unit 101, management regarding the RAT is performed. For example, in the RAT control, management regarding LTE and/or management regarding NR are performed. Management regarding NR includes setting and processing of the parameter set regarding the transmission signal in the NR cell.

In the radio resource control in the upper layer processing unit 101, generation and/or management is performed of downlink data (transport block), system information, an RRC message (RRC parameter), and/or a MAC control element (CE).

In the subframe setting in the upper layer processing unit 101, management is performed of subframe setting, subframe pattern setting, uplink-downlink setting, uplink reference UL-DL setting, and/or downlink reference UL-DL setting. Note that, the subframe setting in the upper layer processing unit 101 is also referred to as base station subframe setting. Furthermore, the subframe setting in the upper layer processing unit 101 can be determined on the basis of the uplink traffic volume and the downlink traffic volume. Furthermore, the subframe setting in the upper layer processing unit 101 can be determined on the basis of a scheduling result of the scheduling control in the upper layer processing unit 101.

In the scheduling control in the upper layer processing unit 101, on the basis of received channel state information and a propagation path estimation value and channel quality input from the channel measurement unit 1059, and the like, a frequency and a subframe to which the physical channel is allocated, an encoding rate, a modulation system, transmission power, and the like of the physical channel are determined. For example, the control unit 103 generates control information (DCI format) on the basis of the scheduling result of the scheduling control in the upper layer processing unit 101.

In the CSI report control in the upper layer processing unit 101, CSI reporting of the terminal device 2 is controlled. For example, setting is controlled regarding a CSI reference resource for making assumption to calculate CSI in the terminal device 2.

In accordance with the control from the control unit 103, the reception unit 105 receives a signal transmitted from the terminal device 2 via the transmission/reception antenna 109, and further performs reception processing such as separation, demodulation, decoding, and the like, and outputs to the control unit 103 information subjected to the reception processing. Note that, the reception processing in the reception unit 105 is performed on the basis of a setting defined in advance or a setting of which the base station device 1 notifies the terminal device 2.

The wireless reception unit 1057 performs, on the uplink signal received via the transmission/reception antenna 109, conversion (down convert) to an intermediate frequency, removal of an unnecessary frequency component, control of amplification level to appropriately maintain the signal level, quadrature demodulation based on in-phase and quadrature components of the received signal, conversion of an analog signal to a digital signal, removal of a Guard Interval (GI), and/or extraction of a frequency domain signal by Fast Fourier Transform (FFT).

The demultiplexing unit 1055 separates an uplink channel such as the PUCCH or PUSCH and/or an uplink reference signal from the signal input from the wireless reception unit 1057. The demultiplexing unit 1055 outputs the uplink reference signal to the channel measurement unit 1059. The demultiplexing unit 1055 performs propagation path compensation for the uplink channel from the propagation path estimation value input from the channel measurement unit 1059.

The demodulation unit 1053 performs, on a modulation symbol of the uplink channel, demodulation of the reception signal by using a modulation system such as Binary Phase Shift Keying (BPSK), Quadrature Phase Shift Keying (QPSK), Quadrature Amplitude Modulation (16QAM), 64QAM, 256QAM, or the like. The demodulation unit 1053 performs separation and demodulation of the MIMO multiplexed uplink channel.

The decoding unit 1051 performs decoding processing on an encoded bit of the uplink channel demodulated. The decoded uplink data and/or uplink control information is output to the control unit 103. The decoding unit 1051 performs, on the PUSCH, decoding processing for each transport block.

The channel measurement unit 1059 measures the propagation path estimation value and/or channel quality and the like from the uplink reference signal input from the demultiplexing unit 1055, and outputs the measured values to the demultiplexing unit 1055 and/or the control unit 103. For example, the channel measurement unit 1059 measures the propagation path estimation value for performing propagation path compensation for the PUCCH or PUSCH by using the UL-DMRS, and measures the channel quality in the uplink by using the SRS.

In accordance with the control from the control unit 103, the transmission unit 107 performs transmission processing such as encoding, modulation, and multiplexing on the downlink control information and the downlink data input from the upper layer processing unit 101. For example, the transmission unit 107 generates and multiplexes the PHICH, PDCCH, EPDCCH, PDSCH, and downlink reference signal, to generate a transmission signal. Note that, the transmission processing in transmission unit 107 is performed on the basis of a setting defined in advance, a setting of which the base station device 1 notifies the terminal device 2, or a setting received via the PDCCH or EPDCCH transmitted on the same subframe.

The encoding unit 1071 performs encoding on an HARQ indicator (HARQ-ACK), downlink control information, and downlink data input from the control unit 103, by using a predetermined encoding system such as block encoding, convolutional encoding, turbo encoding, or the like. The modulation unit 1073 modulates an encoded bit input from the encoding unit 1071 with a predetermined modulation system such as BPSK, QPSK, 16QAM, 64QAM, 256QAM, or the like. The downlink reference signal generation unit 1079 generates a downlink reference signal on the basis of a physical cell identification (PCI), an RRC parameter set in the terminal device 2, and the like. The multiplexing unit 1075 multiplexes a modulation symbol of each channel and the downlink reference signal, and arranges them in a predetermined resource element.

The wireless transmission unit 1077 performs, on the signal from the multiplexing unit 1075, processing such as conversion to a time domain signal by Inverse Fast Fourier Transform (IFFT), addition of a guard interval, generation of a baseband digital signal, conversion to an analog signal, quadrature modulation, conversion of an intermediate frequency signal to a high frequency signal (up convert), removal of an extra frequency component, power amplification, or the like, to generate a transmission signal. The transmission signal output from the wireless transmission unit 1077 is transmitted from the transmission/reception antenna 109.

<Configuration Example of Terminal Device 2 in the Present Embodiment>

Figure 9:
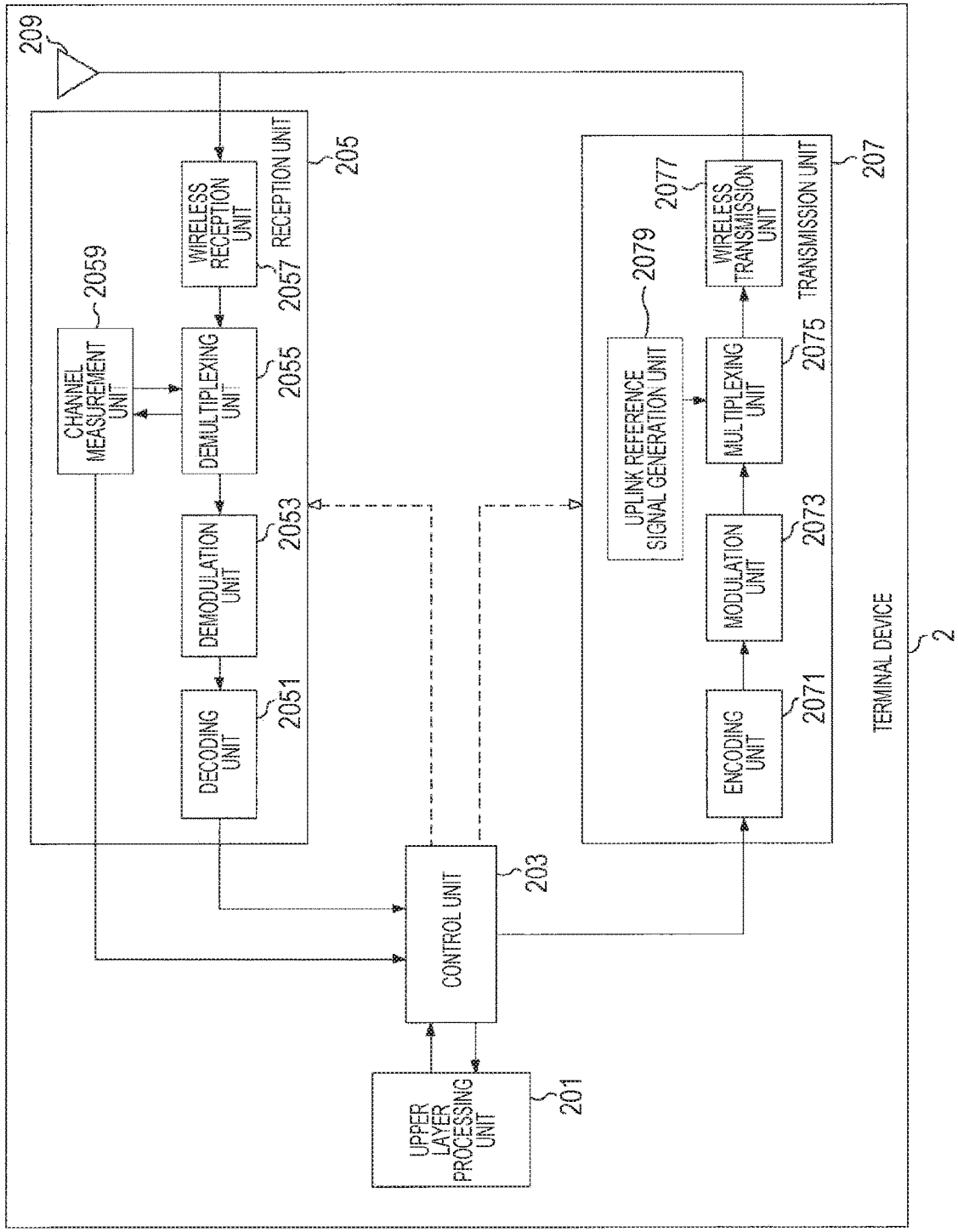
FIG. 9 is a schematic block diagram illustrating a configuration of a terminal device 2 of the present embodiment.

FIG. 9 is a schematic block diagram illustrating a configuration of the terminal device 2 of the present embodiment. As illustrated, the terminal device 2 includes an upper layer processing unit 201, a control unit 203, a reception unit 205, a transmission unit 207, and a transmission/reception antenna 209. Furthermore, the reception unit 205 includes a decoding unit 2051, a demodulation unit 2053, a demultiplexing unit 2055, a wireless reception unit 2057, and a channel measurement unit 2059. Furthermore, the transmission unit 207 includes an encoding unit 2071, a modulation unit 2073, a multiplexing unit 2075, a wireless transmission unit 2077, and an uplink reference signal generation unit 2079.

As described above, the terminal device 2 can support one or more RATs. Some or all of the units included in the terminal device 2 illustrated in FIG. 9 can be individually configured depending on the RAT. For example, the reception unit 205 and the transmission unit 207 are individually configured for LTE and NR. Furthermore, in the NR cell, some or all of the units included in the terminal device 2 illustrated in FIG. 9 can be individually configured depending on the parameter set regarding the transmission signal. For example, in a certain NR cell, the wireless reception unit 2057 and the wireless transmission unit 2077 can be individually configured depending on the parameter set regarding the transmission signal.

The upper layer processing unit 201 outputs uplink data (transport block) to the control unit 203. The upper layer processing unit 201 performs processing of a Medium Access Control (MAC) layer, a Packet Data Convergence Protocol (PDCP) layer, a Radio Link Control (RLC) layer, and a Radio Resource Control (RRC) layer. Furthermore, the upper layer processing unit 201 generates control information to control the reception unit 205 and the transmission unit 207, and outputs the control information to the control unit 203.

The control unit 203 controls the reception unit 205 and the transmission unit 207 on the basis of the control information from the upper layer processing unit 201. The control unit 203 generates control information to the upper layer processing unit 201, and outputs the control information to the upper layer processing unit 201. The control unit 203 inputs a decoded signal from the decoding unit 2051 and a channel estimation result from the channel measurement unit 2059. The control unit 203 outputs a signal to be encoded to the encoding unit 2071. Furthermore, the control unit 203 may be used to control the whole or part of the terminal device 2.

The upper layer processing unit 201 performs processing and management regarding RAT control, radio resource control, subframe setting, scheduling control, and/or CSI report control. The processing and management in the upper layer processing unit 201 are performed on the basis of a setting defined in advance and/or a setting based on control information set or received from the base station device 1. For example, the control information from the base station device 1 includes an RRC parameter, a MAC control element, or DCI. Furthermore, the processing and management in the upper layer processing unit 201 may be performed individually depending on the RAT. For example, the upper layer processing unit 201 individually performs processing and management in LTE and processing and management in NR.

In the RAT control in the upper layer processing unit 201, management regarding the RAT is performed. For example, in the RAT control, management regarding LTE and/or management regarding NR are performed. Management regarding NR includes setting and processing of the parameter set regarding the transmission signal in the NR cell.

In the radio resource control in the upper layer processing unit 201, management is performed of setting information in the terminal device 2. In the radio resource control in the upper layer processing unit 201, generation and/or management is performed of uplink data (transport block), system information, an RRC message (RRC parameter), and/or a MAC control element (CE).

In the subframe setting in the upper layer processing unit 201, subframe setting in the base station device 1 and/or a base station device different from the base station device 1 is managed. The subframe setting includes uplink or downlink setting for the subframe, subframe pattern setting, uplink-downlink setting, uplink reference UL-DL setting, and/or downlink reference UL-DL setting. Note that, the subframe setting in the upper layer processing unit 201 is also referred to as terminal subframe setting.

In the scheduling control in the upper layer processing unit 201, on the basis of the DCI (scheduling information) from the base station device 1, control information is generated for performing control regarding scheduling for the reception unit 205 and the transmission unit 207.

In the CSI report control in the upper layer processing unit 201, control is performed regarding CSI reporting to the base station device 1. For example, in the CSI report control, setting is controlled regarding a CSI reference resource for making assumption to calculate CSI in the channel measurement unit 2059. In the CSI report control, a resource (timing) used to report the CSI is controlled on the basis of the DCI and/or the RRC parameter.

In accordance with the control from the control unit 203, the reception unit 205 receives a signal transmitted from the base station device 1 via the transmission/reception antenna 209, and further performs reception processing such as separation, demodulation, decoding, and the like, and outputs to the control unit 203 information subjected to the reception processing. Note that, the reception processing in the reception unit 205 is performed on the basis of a setting defined in advance, or a notification or setting from the base station device 1.

The wireless reception unit 2057 performs, on the uplink signal received via the transmission/reception antenna 209, conversion (down convert) to an intermediate frequency, removal of an unnecessary frequency component, control of amplification level to appropriately maintain the signal level, quadrature demodulation based on in-phase and quadrature components of the received signal, conversion of an analog signal to a digital signal, removal of a Guard Interval (GI), and/or extraction of a frequency domain signal by Fast Fourier Transform (FFT).

The demultiplexing unit 2055 separates a downlink channel such as the PHICH, PDCCH, EPDCCH, or PDSCH, a downlink synchronization signal, and/or a downlink reference signal from the signal input from the wireless reception unit 2057. The demultiplexing unit 2055 outputs the downlink reference signal to the channel measurement unit 2059. The demultiplexing unit 2055 performs propagation path compensation for the downlink channel from a propagation path estimation value input from the channel measurement unit 2059.

The demodulation unit 2053 performs, on a modulation symbol of the downlink channel, demodulation of the reception signal by using a modulation system such as BPSK, QPSK, 16QAM, 64QAM, 256QAM, or the like. The demodulation unit 2053 performs separation and demodulation of the MIMO multiplexed downlink channel.

The decoding unit 2051 performs decoding processing on an encoded bit of the downlink channel demodulated. The decoded downlink data and/or downlink control information is output to the control unit 203. The decoding unit 2051 performs, on the PDSCH, decoding processing for each transport block.

The channel measurement unit 2059 measures the propagation path estimation value and/or channel quality and the like from the downlink reference signal input from the demultiplexing unit 2055, and outputs the measured values to the demultiplexing unit 2055 and/or the control unit 203. The downlink reference signal used for measurement by the channel measurement unit 2059 may be determined on the basis of at least a transmission mode set by the RRC parameter, and/or another RRC parameter. For example, a DL-DMRS measures the propagation path estimation value for performing propagation path compensation for the PDSCH or EPDCCH. The CRS measures the propagation path estimation value for performing propagation path compensation for the PDCCH or PDSCH, and/or a channel in the downlink for reporting the CSI. The CSI-RS measures the channel in the downlink for reporting the CSI. The channel measurement unit 2059 calculates Reference Signal Received Power (RSRP) and/or Reference Signal Received Quality (RSRQ) on the basis of the CRS, CSI-RS, or a detection signal, and outputs the calculated signal to the upper layer processing unit 201.

In accordance with the control from the control unit 203, the transmission unit 207 performs transmission processing such as encoding, modulation, and multiplexing on the uplink control information and the uplink data input from the upper layer processing unit 201. For example, the transmission unit 207 generates and multiplexes an uplink channel such as the PUSCH or PUCCH, and/or an uplink reference signal, to generate a transmission signal. Note that, the transmission processing in the transmission unit 207 is performed on the basis of a setting defined in advance, or a setting or notification from the base station device 1.

The encoding unit 2071 performs encoding on an HARQ indicator (HARQ-ACK), uplink control information, and uplink data input from the control unit 203, by using a predetermined encoding system such as block encoding, convolutional encoding, turbo encoding, or the like. The modulation unit 2073 modulates an encoded bit input from the encoding unit 2071 with a predetermined modulation system such as BPSK, QPSK, 16QAM, 64QAM, 256QAM, or the like. The uplink reference signal generation unit 2079 generates an uplink reference signal on the basis of the RRC parameter set in the terminal device 2, and the like. The multiplexing unit 2075 multiplexes a modulation symbol of each channel and the uplink reference signal, and arranges them in a predetermined resource element.

The wireless transmission unit 2077 performs, on the signal from the multiplexing unit 2075, processing such as conversion to a time domain signal by Inverse Fast Fourier Transform (IFFT), addition of a guard interval, generation of a baseband digital signal, conversion to an analog signal, quadrature modulation, conversion of an intermediate frequency signal to a high frequency signal (up convert), removal of an extra frequency component, power amplification, or the like, to generate a transmission signal. The transmission signal output from the wireless transmission unit 2077 is transmitted from the transmission/reception antenna 209.

<Signaling of Control Information in the Present Embodiment>

The base station device 1 and the terminal device 2 each can use various methods for signaling (notification, broadcasting, setting) of control information. Signaling of control information can be performed at various layers. Signaling of control information includes physical layer signaling that is signaling through a physical layer, RRC signaling that is signaling through an RRC layer, MAC signaling that is signaling through a MAC layer, and the like. RRC signaling is dedicated RRC signaling for notifying the terminal device 2 of unique control information, or common RRC signaling for notifying the base station device 1 of unique control information. Signaling used by an upper layer seen from the physical layer, such as RRC signaling or MAC signaling, is also referred to as upper layer signaling.

RRC signaling is implemented by signaling an RRC parameter. MAC signaling is implemented by signaling a MAC control element. Physical layer signaling is implemented by signaling downlink control information (DCI) or uplink control information (UCI). Physical layer signaling is also referred to as DCI signaling, UCI signaling, PDCCH signaling, or PUCCH signaling. The RRC parameter and the MAC control element are transmitted by using the PDSCH or PUSCH. The DCI is transmitted by using the PDCCH or EPDCCH. The UCI is transmitted by using the PUCCH or PUSCH. RRC signaling and MAC signaling are used for signaling semi-static control information, and also referred to as semi-static signaling. Physical layer signaling is used for signaling dynamic control information, and also referred to as dynamic signaling. The DCI is used for PDSCH scheduling, PUSCH scheduling, or the like. The UCI is used for CSI reporting, HARQ-ACK reporting, and/or a scheduling request (SR).

<Details of Downlink Control Information in the Present Embodiment>

Notification of the DCI is performed by using a DCI format having a field defined in advance. The field defined in the DCI format is mapped with a predetermined information bit. The DCI performs notification of downlink scheduling information, uplink scheduling information, sidelink scheduling information, a non-periodic CSI reporting request, or an uplink transmission power command.

The DCI format monitored by the terminal device 2 is determined by a transmission mode set for each serving cell. In other words, part of the DCI format monitored by the terminal device 2 can differ depending on the transmission mode. For example, the terminal device 2 in which the downlink transmission mode 1 is set monitors the DCI format 1A and the DCI format 1. For example, the terminal device 2 in which the downlink transmission mode 4 is set monitors the DCI format 1A and the DCI format 2. For example, the terminal device 2 in which the uplink transmission mode 1 is set monitors the DCI format 0. For example, the terminal device 2 in which the uplink transmission mode 2 is set monitors the DCI format 0 and the DCI format 4.

Notification is not performed of a control region in which the PDCCH for performing notification of DCI for the terminal device 2 is arranged, and the terminal device 2 detects the DCI for the terminal device 2 by blind decoding (blind detection). Specifically, the terminal device 2 monitors a set of PDCCH candidates in the serving cell. Monitoring means that decoding is attempted with all monitored DCI formats for each of the PDCCHs in the set. For example, the terminal device 2 attempts to decode all aggregation levels, PDCCH candidates, and DCI formats that may be transmitted to the terminal device 2. The terminal device 2 recognizes DCI (PDCCH) successfully decoded (detected) as the DCI (PDCCH) for the terminal device 2.

A cyclic redundancy check (CRC) is added to the DCI. The CRC is used for DCI error detection and DCI blind detection. The CRC (CRC parity bit) is scrambled with a radio network temporary identifier (RNTI). The terminal device 2 detects whether it is the DCI for the terminal device 2 on the basis of the RNTI. Specifically, the terminal device 2 descrambles a bit corresponding to the CRC with a predetermined RNTI, extracts the CRC, and detects whether the corresponding DCI is correct.

The RNTI is defined or set depending on a purpose and application of the DCI. The RNTI includes Cell-RNTI (C-RNTI), Semi Persistent Scheduling C-RNTI (SPS C-RNTI), System Information-RNTI (SI-RNTI), Paging-RNTI (P-RNTI), Random Access-RNTI (RA-RNTI), Transmit Power Control-PUCCH-RNTI (TPC-PUCCH-RNTI), Transmit Power Control-PUSCH-RNTI (TPC-PUSCH-RNTI), Temporary C-RNTI, Multimedia Broadcast Multicast Services (MBMS)-RNTI (M-RNTI), eIMTA-RNTI, and CC-RNTI.

The C-RNTI and SPS C-RNTI each are an RNTI unique to the terminal device 2 in the base station device 1 (cell), and an identifier for identifying the terminal device 2. The C-RNTI is used to schedule the PDSCH or PUSCH in a certain subframe. The SPS C-RNTI is used to activate or release periodic scheduling of a resource for the PDSCH or PUSCH. A control channel including a CRC scrambled with the SI-RNTI is used to schedule a System Information Block (SIB). A control channel including a CRC scrambled with the P-RNTI is used to control paging. A control channel including a CRC scrambled with the RA-RNTI is used to schedule a response for the RACH. A control channel including a CRC scrambled with the TPC-PUCCH-RNTI is used to perform power control of the PUCCH. A control channel including a CRC scrambled with the TPC-PUSCH-RNTI is used to perform power control of the PUSCH. A control channel including a CRC scrambled with the Temporary C-RNTI is used by a mobile station device for which the C-RNTI is not set or recognized. A control channel including a CRC scrambled with the M-RNTI is used to schedule the MBMS. A control channel including a CRC scrambled with the eIMTA-RNTI is used to perform notification of information regarding TDD UL/DL setting of a TDD serving cell, in dynamic TDD (eIMTA). A control channel (DCI) including a CRC scrambled with the CC-RNTI is used to perform notification of the setting of an occupied OFDM symbol, in a LAA secondary cell. Note that, the DCI format may be scrambled with a new RNTI, not limited to the above RNTI.

Scheduling information (downlink scheduling information, uplink scheduling information, sidelink scheduling information) includes information for performing scheduling, as frequency domain scheduling, on a resource block basis or a resource block group basis. The resource block group is a set of consecutive resource blocks and indicates allocated resources for a terminal device to be scheduled. The size of the resource block group is determined depending on the system bandwidth.

<Details of Downlink Control Channel in the Present Embodiment>

The DCI is transmitted by using a control channel such as the PDCCH or EPDCCH. The terminal device 2 monitors a set of PDCCH candidates and/or a set of EPDCCH candidates of one or a plurality of activated serving cells set by RRC signaling. Here, monitoring refers to attempting to decode the PDCCH and/or EPDCCH in a set corresponding to all monitored DCI formats.

The set of PDCCH candidates or the set of EPDCCH candidates is also referred to as a search space. In the search space, a common search space (CSS) and a UE-specific search space (USS) are defined. The CSS may be defined only for the search space for the PDCCH.

The common search space (CSS) is a search space set on the basis of a parameter unique to the base station device 1 and/or a parameter defined in advance. For example, the CSS is a search space commonly used by a plurality of terminal devices. Therefore, the base station device 1 maps a common control channel in the plurality of terminal devices to the CSS, whereby the resource for transmitting a control channel is reduced.

The UE-specific search space (USS) is a search space set by using at least a parameter unique to the terminal device 2. Therefore, the USS is a search space unique to the terminal device 2, and the base station device 1 can individually transmit a control channel unique to the terminal device 2 by the USS. Therefore, the base station device 1 can efficiently map control channels unique to the plurality of terminal devices.

The USS may be set to be commonly used by the plurality of terminal devices. To set a common USS for the plurality of terminal devices, the parameter unique to the terminal device 2 is set to be the same value among the plurality of terminal devices. For example, a unit in which the same parameters are set among the plurality of terminal devices is a cell, a transmission point, a group of predetermined terminal devices, or the like.

The search space for each aggregation level is defined by the set of PDCCH candidates. Each PDCCH is transmitted by using a set of one or more control channel elements (CCEs). The number of CCEs used for one PDCCH is also referred to as an aggregation level. For example, the number of CCEs used for one PDCCH is one, two, four, or eight.

The search space for each aggregation level is defined by the set of EPDCCH candidates. Each EPDCCH is transmitted by using a set of one or more enhanced control channel elements (ECCEs). The number of ECCEs used for one EPDCCH is also referred to as an aggregation level. For example, the number of ECCEs used for one EPDCCH is 1, 2, 4, 8, 16, or 32.

The number of PDCCH candidates or the number of EPDCCH candidates is determined on the basis of at least the search space and the aggregation level. For example, in the CSS, the numbers of PDCCH candidates at aggregation levels 4 and 8 are four and two, respectively. For example, in the USS, the numbers of PDCCH candidates in aggregations 1, 2, 4, and 8 are six, six, two, and two, respectively.

Each ECCE includes a plurality of enhanced resource element groups (EREGs). The EREG is used to define mapping of the EPDCCH to the resource element. In each RB pair, 16 EREGs are defined, numbered from 0 to 15. In other words, an EREG 0 to an EREG 15 are defined in each RB pair. In each RB pair, the EREG 0 to the EREG 15 are periodically defined, with priority given to the frequency direction, with respect to resource elements other than the resource element to which a predetermined signal and/or channel are mapped. For example, a resource element to which a demodulation reference signal associated with the EPDCCH transmitted on the antenna ports 107 to 110 is mapped is not defined as the EREG The number of ECCEs used for one EPDCCH depends on an EPDCCH format, and is determined on the basis of another parameter. The number of ECCEs used for one EPDCCH is also referred to as an aggregation level. For example, the number of ECCEs used for one EPDCCH is determined on the basis of the number of resource elements that can be used for EPDCCH transmission in one RB pair, a method of transmitting the EPDCCH, and the like. For example, the number of ECCEs used for one EPDCCH is 1, 2, 4, 8, 16, or 32. Furthermore, the number of EREGs used for one ECCE is determined on the basis of a type of the subframe and a type of a cyclic prefix, and is four or eight. As the method of transmitting the EPDCCH, distributed transmission and localized transmission are supported.

The EPDCCH can use distributed transmission or localized transmission. Distributed transmission and localized transmission differ from each other in mapping of the ECCE to the EREG and the RB pair. For example, in distributed transmission, one ECCE is configured by using EREGs of a plurality of RB pairs. In localized transmission, one ECCE is configured by using EREGs of one RB pair.

The base station device 1 performs setting regarding the EPDCCH for the terminal device 2. The terminal device 2 monitors a plurality of EPDCCHs on the basis of the setting from the base station device 1. A set of RB pairs for which the terminal device 2 monitors the EPDCCH can be set. The set of RB pairs is also referred to as an EPDCCH set or an EPDCCH-PRB set. One or more EPDCCH sets can be set for one terminal device 2. Each EPDCCH set includes one or more RB pairs. Furthermore, the setting regarding the EPDCCH can be performed individually for each EPDCCH set.

The base station device 1 can set a predetermined number of EPDCCH sets for the terminal device 2. For example, up to two EPDCCH sets can be set as an EPDCCH set 0 and/or an EPDCCH set 1. Each of the EPDCCH sets can include a predetermined number of RB pairs. Each EPDCCH set constitutes one set of a plurality of ECCEs. The number of ECCEs included in one EPDCCH set is determined on the basis of the number of RB pairs set as the EPDCCH set and the number of EREGs used in one ECCE. In a case where the number of ECCEs included in one EPDCCH set is N, each EPDCCH set constitutes ECCEs numbered 0 to N−1. For example, in a case where the number of EREGs used in one ECCE is four, an EPDCCH set including four RB pairs constitutes 16 ECCEs.

<Details of Resource Allocation in the Present Embodiment>

The base station device 1 can use a plurality of methods as a method of resource allocation of the PDSCH and/or PUSCH to the terminal device 2. The method of resource allocation includes dynamic scheduling, semi-persistent scheduling, multi-subframe scheduling, and cross subframe scheduling.

In dynamic scheduling, one DCI performs resource allocation in one subframe. Specifically, the PDCCH or EPDCCH in a certain subframe performs scheduling for the PDSCH in the subframe. The PDCCH or EPDCCH in a certain subframe performs scheduling for the PUSCH in a predetermined subframe after the subframe.

In multi-subframe scheduling, one DCI performs resource allocation in one or more subframes. Specifically, the PDCCH or EPDCCH in a certain subframe performs scheduling for the PDSCH in one or more subframes after a predetermined number of subframes from the subframe. The PDCCH or EPDCCH in a certain subframe performs scheduling for the PUSCH in one or more subframes after a predetermined number of subframes from the subframe. The predetermined number can be an integer greater than or equal to zero. The predetermined number may be defined in advance or may be determined on the basis of physical layer signaling and/or RRC signaling. In multi-subframe scheduling, consecutive subframes may be scheduled, or subframes having a predetermined period may be scheduled. The number of subframes to be scheduled may be defined in advance, or may be determined on the basis of physical layer signaling and/or RRC signaling.

In cross subframe scheduling, one DCI performs resource allocation in one subframe. Specifically, the PDCCH or EPDCCH in a certain subframe performs scheduling for the PDSCH in one subframe after a predetermined number of subframes from the subframe. The PDCCH or EPDCCH in a certain subframe performs scheduling for the PUSCH in one subframe after a predetermined number of subframes from the subframe. The predetermined number can be an integer greater than or equal to zero. The predetermined number may be defined in advance or may be determined on the basis of physical layer signaling and/or RRC signaling.

In cross subframe scheduling, consecutive subframes may be scheduled, or subframes having a predetermined period may be scheduled.

In semi-persistent scheduling (SPS), one DCI performs resource allocation in one or more subframes. In a case where information regarding the SPS is set by RRC signaling and the PDCCH or EPDCCH for enabling the SPS is detected, the terminal device 2 enables processing for the SPS, and receives a predetermined PDSCH and/or PUSCH on the basis of the setting for the SPS. In a case where the PDCCH or EPDCCH for releasing the SPS is detected when the SPS is enabled, the terminal device 2 releases (disables) the SPS and stops reception of the predetermined PDSCH and/or PUSCH. The release of the SPS may be performed on the basis of a case where a predetermined condition is satisfied. For example, the SPS is released in a case where a predetermined number of empty transmission data is received. Empty transmission of data for releasing the SPS corresponds to MAC Protocol Data Unit (PDU) including zero MAC Service Data Unit (SDU).

Information regarding the SPS by RRC signaling includes an SPS C-RNTI that is an RNTI of the SPS, information regarding a period (interval) to be scheduled for the PDSCH, information regarding a period (interval) to be scheduled for the PUSCH, information regarding a setting for releasing the SPS, and/or an HARQ process number in the SPS. The SPS is supported only for the primary cell and/or the primary secondary cell.

<HARQ in the Present Embodiment>

In the present embodiment, an HARQ has various features. The HARQ transmits and retransmits a transport block. In the HARQ, a predetermined number of processes (HARQ processes) are used (set), and each of the processes operates independently in a stop-and-wait manner.

In the downlink, the HARQ is asynchronous and operates adaptively. In other words, in the downlink, retransmission is always scheduled through the PDCCH. Uplink HARQ-ACK (response information) corresponding to downlink transmission is transmitted on the PUCCH or PUSCH. In the downlink, the PDCCH performs notification of an HARQ process number indicating its HARQ process, and information indicating whether the transmission is initial transmission or retransmission.

In the uplink, the HARQ operates synchronously or asynchronously. Downlink HARQ-ACK (response information) corresponding to uplink transmission is transmitted on the PHICH, PDSCH or PDCCH. In the uplink HARQ, operation of a terminal device is determined on the basis of the HARQ feedback received by the terminal device and/or the PDCCH received by the terminal device. For example, in a case where the PDCCH is not received and the HARQ feedback is ACK, the terminal device does not perform transmission (retransmission) and holds data in the HARQ buffer. In that case, the PDCCH may be transmitted to resume retransmission. Furthermore, for example, in a case where the PDCCH is not received and the HARQ feedback is NACK, the terminal device performs retransmission non-adaptively in a predetermined uplink subframe. Furthermore, for example, in a case where the PDCCH is received, the terminal device performs transmission or retransmission on the basis of the content received via the PDCCH regardless of the content of the HARQ feedback.

Note that, in the uplink, in a case where a predetermined condition (setting) is satisfied, the HARQ may operate only asynchronously. In other words, the downlink HARQ-ACK is not transmitted, and retransmission in the uplink may always be scheduled through the PDCCH.

In the HARQ-ACK reporting, the HARQ-ACK indicates ACK, NACK, or DTX. In a case where the HARQ-ACK is ACK, it indicates that the transport block (codeword, channel) corresponding to the HARQ-ACK is correctly received (decoded). In a case where the HARQ-ACK is NACK, it indicates that the transport block (codeword, channel) corresponding to the HARQ-ACK is not correctly received (decoded). In a case where the HARQ-ACK is DTX, it indicates that the transport block (codeword, channel) corresponding to the HARQ-ACK does not exist (is not transmitted).

Furthermore, transmission (notification) of the HARQ-ACK (response information) can be performed by using various processing units. For example, the HARQ-ACK can be transmitted for each transport block, codeword, code block, or code block group. Here, the transport block and codeword can be processing units for the modulation system and/or encoding rate. One data channel can transmit up to two transport blocks and codewords. Furthermore, the code block can be a processing unit of an error correction code such as a turbo code, a convolutional code, a Low Density Parity Check (LDPC) code, or a Polar code. One transport block includes one or more codewords. The maximum bit depth in one code block can be defined or set. The maximum bit depth may be determined depending on the error correction code used, the size of the codeword, and/or the type of the channel. Furthermore, the code block group includes one or more code blocks. In that case, one transport block includes one or more code block groups. The number of code blocks included in the code block group can be defined or set uniquely for the base station, the cell, and/or the terminal. The number may be determined depending on the error correction code used, the size of the codeword, and/or the type of the channel.

In each of the downlink and uplink, a predetermined number of HARQ processes are set (defined). For example, in FDD, up to eight HARQ processes are used for each serving cell. Furthermore, for example, in TDD, the maximum number of HARQ processes is determined by the uplink/downlink setting. The maximum number of HARQ processes may be determined on the basis of round trip time (RTT). For example, in a case where the RTT is 8 TTIs, the maximum number of HARQ processes can be eight.

In the present embodiment, HARQ information includes at least a new data indicator (NDI) and transport block size (TBS). The NDI is information indicating whether the transport block corresponding to the HARQ information is initial transmission or retransmission. The TBS is the size of the transport block. The transport block is a block of data in a transport channel (transport layer), and can be a unit for performing the HARQ. In DL-SCH transmission, the HARQ information further includes an HARQ process ID (HARQ process number). In UL-SCH transmission, the HARQ information further includes a redundancy version (RV) that is information for specifying an information bit and a parity bit after encoding for the transport block. In the case of spatial multiplexing in the DL-SCH, the HARQ information includes a set of the NDI and TBS for each transport block.

<Frame Configuration (Time Domain) of NR in the Present Embodiment>

In a frame configuration of NR, definition can be made by the subframe, the slot, and the mini-slot. The subframe includes 14 symbols, and can be used in the definition of the frame configuration in a reference subcarrier interval (defined subcarrier interval). The slot is a symbol section in the subcarrier interval used for communication, and includes 7 or 14 symbols. The number of symbols constituting one slot can be set from the base station device 1 uniquely for the cell or uniquely for the terminal device. The mini-slot can include symbols fewer than symbols constituting the slot. For example, one mini-slot includes one to six symbols, and can be set from the base station device 1 uniquely for the cell or uniquely for the terminal device. Both the slot and the mini-slot are used as units of time domain resources for communication. For example, the slot is used for communication for eMBB and mMTC, and the mini-slot is used for communication for URLLC. Furthermore, names of the slot and the mini-slot do not have to be distinguished from each other.

Figure 10:
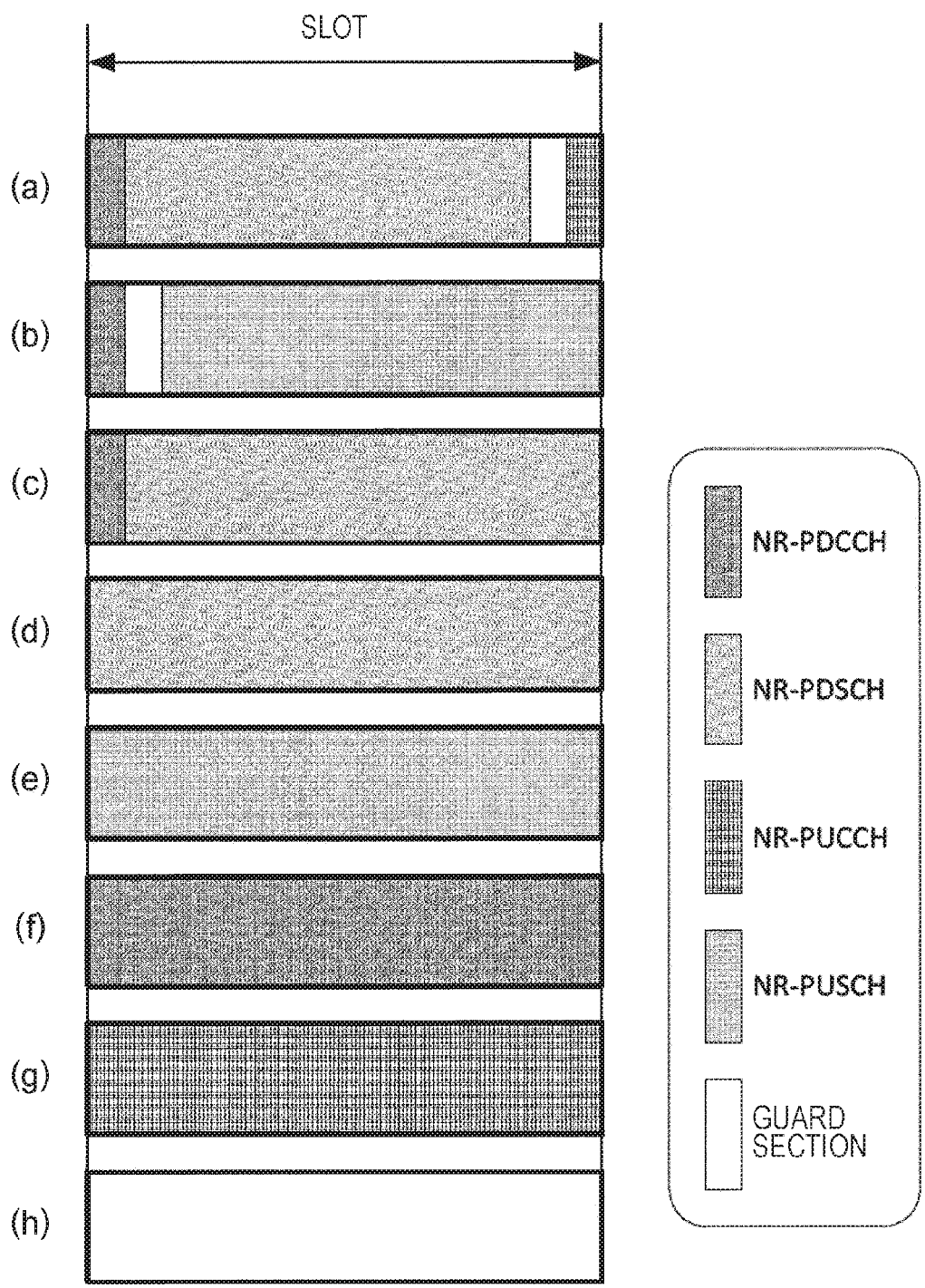
FIG. 10 illustrates an example of a frame configuration of NR in the present embodiment.

FIG. 10 illustrates an example of the frame configuration of NR in the present embodiment. FIG. 10 illustrates a frame configuration in a predetermined frequency domain. For example, the frequency domain includes the resource block, subband, system bandwidth, or the like. Therefore, the frame configuration as illustrated in FIG. 10 can be frequency-multiplexed and/or spatially multiplexed.

In NR, one slot includes downlink communication, a guard section (guard period: GP), and/or downlink communication. The downlink communication includes downlink channels such as the NR-PDCCH and/or the NR-PDSCH. Furthermore, the downlink transmission includes a reference signal associated with the NR-PDCCH and/or the NR-PDSCH. The uplink communication includes uplink channels such as the NR-PUCCH and/or the NR-PUSCH. Furthermore, the downlink communication includes a reference signal associated with the NR-PUCCH and/or the NR-PUSCH. The GP is a time domain where nothing is transmitted. For example, the GP is used to adjust a time for switching from reception of the downlink communication to transmission of the uplink communication in the terminal device 2, a processing time in the terminal device 2, and/or a transmission timing of the uplink communication.

As illustrated in FIG. 10, NR can use various frame configurations. FIG. 10(a) includes the NR-PDCCH, NR-PDSCH, GP and NR-PUCCH. The NR-PDCCH performs notification of allocation information on the NR-PDSCH, and the NR-PUCCH in the same slot performs notification of the HARQ-ACK for the received NR-PDSCH. FIG. 10(b) includes the NR-PDCCH, GP, and NR-PUSCH. The NR-PDCCH performs notification of allocation information on the NR-PUSCH, and the NR-PUSCH is transmitted on an allocated resource in the same slot. The frame configurations as illustrated in FIGS. 10(a) and 10(b) are also referred to as Self-contained frames because the downlink communication and the uplink communication are completed in the same slot.

FIGS. 10(c) to 10(g) are slots including only the downlink communication or only the uplink communication. In FIG. 10(c), the NR-PDSCH can be scheduled by the NR-PDCCH in the same slot. In FIGS. 10(d) and 10(e), the NR-PDSCH and the NR-PUSCH each can be scheduled by the NR-PDCCH mapped to a different slot, or by RRC signaling or the like. In FIG. 10(h), the entire slot is the guard section and used as a region not communicated.

<Outline of Uplink Signal Waveform in the Present Embodiment>

In the present embodiment, a plurality of types of signal waveforms is defined in the uplink. For example, two uplink signal waveforms can be defined, and set as a first signal waveform and a second signal waveform, respectively. In the present embodiment, the first signal waveform is Cyclic Prefix-Orthogonal Frequency Division Multiplexing (CP-OFDM), and the second signal waveform is Single Carrier-Frequency Division Multiple Access (SC-FDMA). Furthermore, the second signal waveform is also referred to as Discrete Fourier Transform-Spread-Orthogonal Frequency Division Multiplexing (DFT-s-OFDM).

That is, the first signal waveform is a multicarrier signal, and the second signal waveform is a single carrier signal. Furthermore, the first signal waveform is the same as the downlink signal waveform in LTE and NR, and the second signal waveform is the same as the uplink signal waveform in LTE.

These signal waveforms can differ from each other in terms of power efficiency, transmission efficiency, transmission (generation) method, reception method, resource mapping, and the like. For example, the second signal waveform can reduce a Peak-to-Average Power Ratio (PAPR) compared to the first signal waveform, thereby being superior in power efficiency. Furthermore, the first signal waveform can frequency-multiplex the reference signal with data in the frequency direction, thereby being superior in terms of transmission efficiency compared to the second signal waveform. Furthermore, in a case where it is necessary to perform frequency domain equalization in reception processing for the second signal waveform, the second signal waveform has a high load of the reception processing compared to the first signal waveform. Furthermore, the first signal waveform has a narrow subcarrier interval compared to the second signal waveform, thereby being susceptible to phase noise particularly in a high frequency band.

<Overview of Reliability Control of Response Information to Data in the Present Embodiment>

In the present embodiment, response information (HARQ-ACK) to data is transmitted by a predetermined transmission method regarding reliability. The predetermined transmission method can be determined depending on reliability priority for the data.

Note that, in the following description, the data includes a data channel, and the data channel includes downlink channels such as the PDSCH and uplink channels such as the PUSCH. Furthermore, the control channel is a physical channel for transmitting the response information to the data, and the control channel includes uplink channels such as the PUCCH and PUSCH, and downlink channels such as the PDCCH, PHICH, and PDSCH. In other words, contents described in the present embodiment can be implemented in both a case where the base station device transmits the data channel and the terminal device transmits the control channel, and a case where the terminal device transmits the data channel and the base station device transmits the control channel.

Furthermore, as described above, the response information can be transmitted for each transport block, codeword, code block, or code block group, but for the sake of simplicity, in the following description, the data and the response information are described as a channel or information for each slot.

Figure 11:
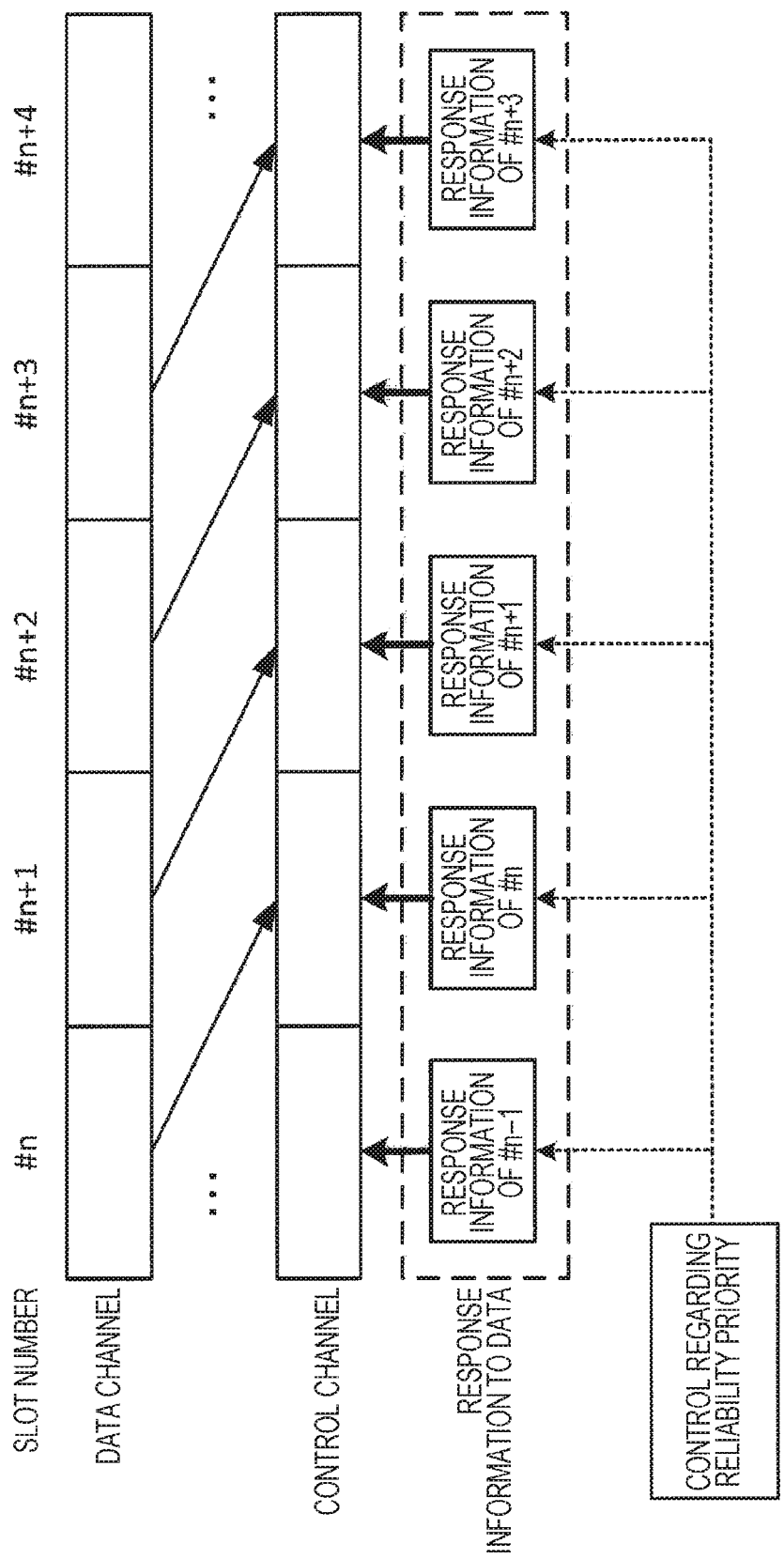
FIG. 11 illustrates an example of reliability control of response information to data.

FIG. 11 illustrates an example of reliability control of the response information to the data. In the figure, five slots are illustrated from slot numbers #n to #n+4. Furthermore, in a case where a data channel in a predetermined slot is transmitted, the response information in the data channel is transmitted on a control channel of the next slot. Therefore, control channels in the slots from the slot numbers #n to #n+4 respectively transmit pieces of the response information to the data in the slots from slot numbers #n−1 to #n+3.

These pieces of the response information each are controlled regarding the reliability priority, and transmitted by a predetermined transmission method determined depending on the reliability priority.

The reliability priority and the predetermined transmission method regarding the reliability will be described later. Furthermore, the predetermined transmission method regarding the reliability is also simply referred to as a predetermined transmission method.

<Multiplexing of Response Information Repeatedly Transmitted in the Present Embodiment>

Figure 12:
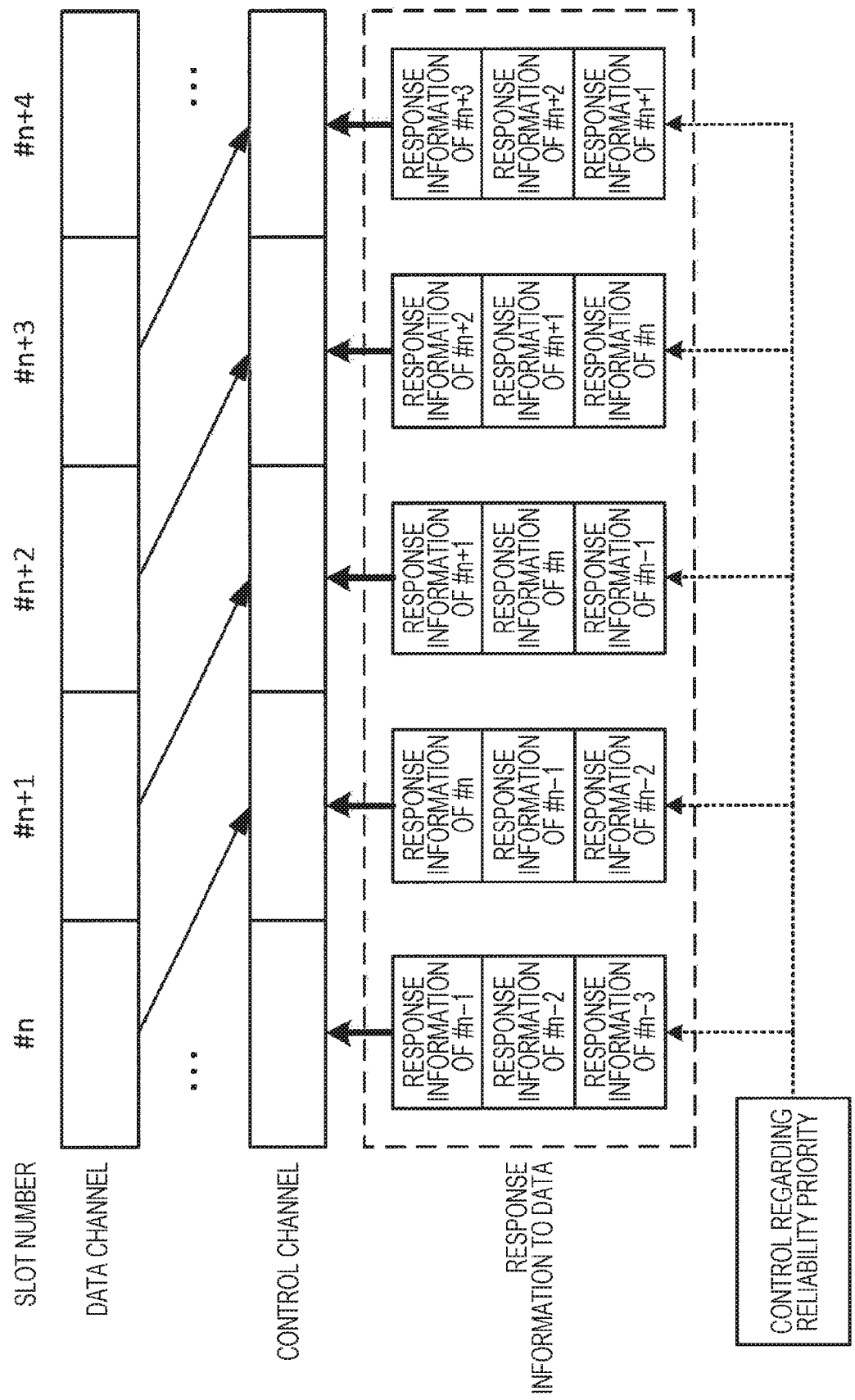
FIG. 12 illustrates an example of a method of multiplexing the response information repeatedly transmitted.

The response information to the data can be repeatedly transmitted on a plurality of control channels. Furthermore, in a certain control channel and/or slot, pieces of the response information to the data in a plurality of slots can be multiplexed. FIG. 12 illustrates an example.

In other words, in a control channel of a predetermined slot, a predetermined number of pieces of the response information to the data in the predetermined number of slots before the predetermined slot is multiplexed. Moreover, any of the predetermined number of pieces of the response information is repeatedly transmitted a plurality of times on different control channels. Furthermore, the predetermined number of pieces of the response information multiplexed in the predetermined slot is transmitted on one uplink physical channel.

Furthermore, these pieces of the response information each are controlled regarding the reliability priority, and transmitted by a predetermined transmission method determined depending on the reliability priority. The control may be performed for each slot, or may be performed for each piece of the response information multiplexed in the same slot.

In the example of FIG. 12, the control channel in a certain slot multiplexes and transmits pieces of the response information to the data in three slots closest to the slot.

<Reliability Priority in the Present Embodiment>

In the present embodiment, the reliability priority is priority regarding the reliability of the response information. In the present embodiment, the reliability priority is also simply referred to as priority. Furthermore, the reliability priority may be regarded simply as a parameter or a value.

The reliability priority can be controlled in various units. For example, the reliability priority can be controlled in units of the response information, predetermined response information group, control channel, slot, mini-slot, subframe, radio frame, cell, and/or base station.

Control of the reliability priority (reliability prioritization) is performed depending on various factors and/or parameters. A specific control method is any one or a combination of methods described below.

As an example of a reliability priority control method, the reliability priority is determined depending on the order of the slot in which the data is received (transmitted). In other words, the reliability priority is given by a reception (transmission) timing of the data. For example, regarding the response information for the slot that is temporally new, the reliability priority is set higher.

As another example of the reliability priority control method, the reliability priority is determined on the basis of an HARQ timing received. Here, the HARQ timing is a timing of the data transmitted and the response information to the data, and notification of the HARQ timing can be performed by RRC signaling and/or PDCCH signaling. In other words, the reliability priority is given by at least a transmission timing of the response information to reception of the data. For example, for the response information having a short HARQ timing, the reliability priority is set higher. For example, in a case where the data and its response information are transmitted and received in the same slot, the reliability priority of the response information is set higher.

As another example of the reliability priority control method, the reliability priority is determined on the basis of the number of repetitions of the response information. In other words, the reliability priority is given by at least the number of times of repeated transmission of the response information. For example, for the response information having a large number of times of repeated transmission so far, the reliability priority is set higher. Furthermore, for example, for the response information having a large number of repetitions of the setting or notification, the reliability priority is set higher.

As another example of the reliability priority control method, the reliability priority is determined on the basis of the type of the channel corresponding to the response information. For example, for the response information to the control channel, the reliability priority is set higher, and for the response information to the data channel, the reliability priority is set lower.

As another example of the reliability priority control method, the reliability priority is received or set from the base station. For example, the reliability priority is determined for each data channel, and included in control information for allocating the data channel. In other words, the reliability priority is given by at least the control information for the data channel.

As another example of the reliability priority control method, the reliability priority is determined on the basis of the size of the data. For example, the reliability priority is set higher as the size of the data is increased. For example, the size of the data is the number of resource blocks, the size (bit depth) of the transport block, the size (bit depth) of the code block, or the size (bit depth) of the code block group.

As another example of the reliability priority control method, the reliability priority is determined on the basis of the HARQ process. For example, the reliability priority is set higher as the number of HARQ processes decreases. Furthermore, for example, the reliability priority is set higher in the case of a predetermined HARQ process number. The predetermined HARQ process number is 0.

<Predetermined Transmission Method Regarding Reliability in the Present Embodiment>

In the present embodiment, the predetermined transmission method regarding the reliability is controlled on the basis of the reliability priority. For example, the response information having a high reliability priority is transmitted by using a highly reliable transmission method.

An example of the predetermined transmission method regarding the reliability is a method regarding repeated transmission. For example, the response information having a high reliability priority is transmitted by increasing the number of times of repeated transmission. This repeated transmission can be performed in the frequency direction and/or in the time direction. Note that, this repeated transmission may be performed on each individual control channel or may be performed in the same control channel.

Figure 13:
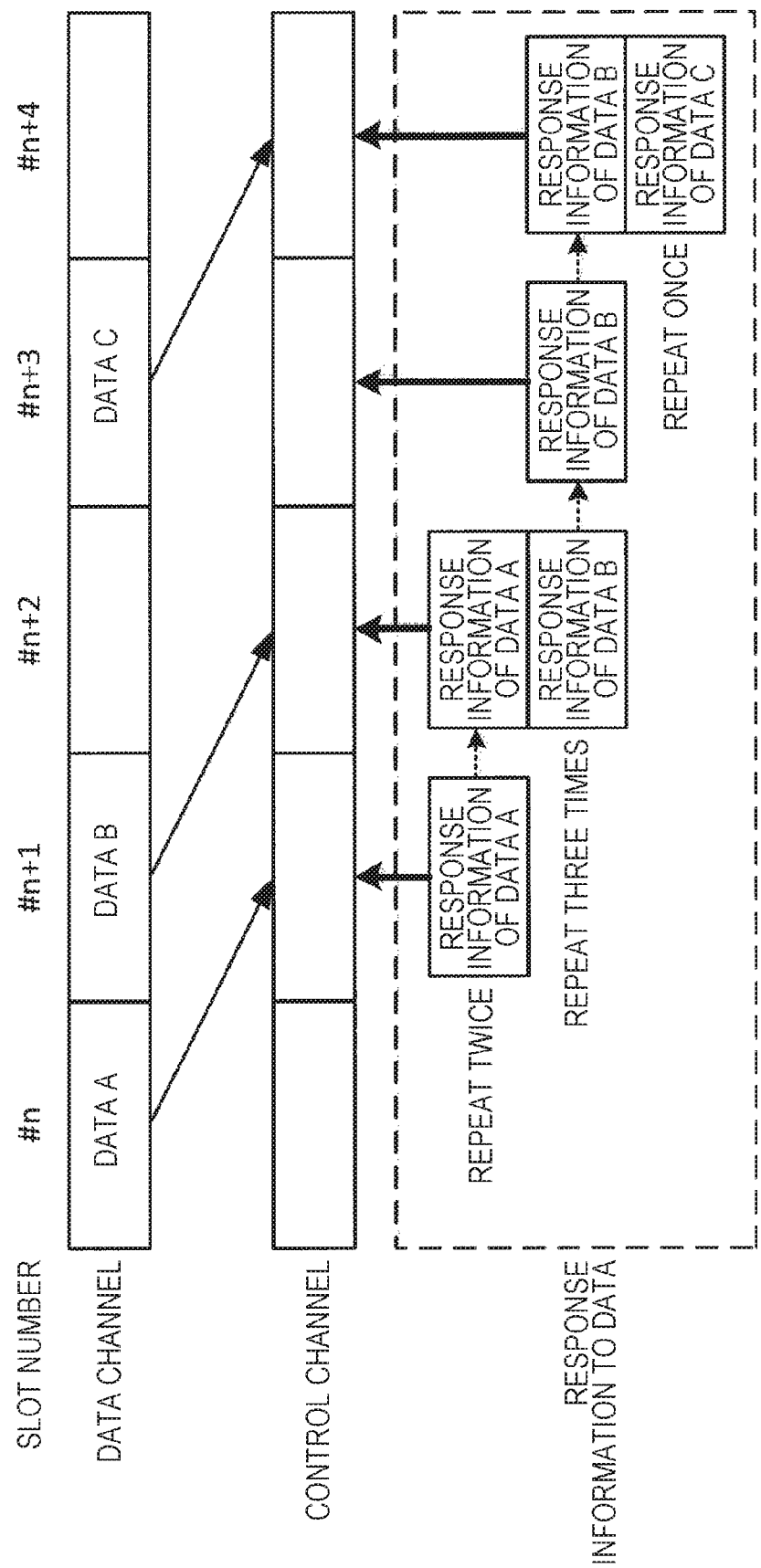
FIG. 13 is a diagram illustrating an example of reliability control regarding the number of times of repeated transmission.

FIG. 13 is a diagram illustrating an example of reliability control regarding the number of times of repeated transmission. The number of times of repeated transmission is determined on the basis of the reliability priority, for each data. In the example of FIG. 13, the numbers of times of repeated transmission for response information of data A, B, and C are twice, three times, and once, respectively. In this case, the response information of the data A is transmitted on the control channel of the slot #n+1, the response information of the data A and the response information of the data B are multiplexed and transmitted on the control channel of the slot #n+2, the response information of the data B is transmitted on the control channel of the slot #n+3, and the response information of the data B and the response information of the data C are multiplexed and transmitted on the control channel of the slot #n+4.

Another example of the predetermined transmission method regarding the reliability is a method regarding the error correction code. For example, the response information having a high reliability priority is transmitted with a low encoding rate (with a high encoding gain) in the error correction code. Furthermore, for example, the response information having a high reliability priority is transmitted by using an error correction code having a high encoding gain.

Another example of the predetermined transmission method regarding the reliability is a method regarding the transmission power. For example, the response information having a high reliability priority is transmitted with high transmission power. The transmission power is determined on the basis of at least an index defined in advance and/or an offset value defined in advance, and the index and/or the offset value are determined on the basis of the reliability priority.

Another example of the predetermined transmission method regarding the reliability is a method regarding the modulation system. For example, the response information having a high reliability priority is transmitted by using a modulation system having low modulation multilevel number (modulation order). Specifically, the modulation system includes BPSK, QPSK, 16QAM, 64QAM, 256QAM, and 1024QAM in ascending order of the modulation multilevel number. Furthermore, BPSK may shift the phase by $\pi/2$ for each symbol.

Another example of the predetermined transmission method regarding the reliability is a method regarding resource element mapping. For example, the response information having a high reliability priority is transmitted by being mapped to a highly reliable resource element. The highly reliable resource element is a resource element around a resource element to which the reference signal is mapped. Specifically, the response information having a high reliability priority is transmitted by being mapped to a resource element adjacent to the resource element to which the reference signal is mapped. As a result, the response information having a high reliability priority has a high accuracy of transmission path estimation on the reception side.

Another example of the predetermined transmission method regarding the reliability is a method regarding the size of the resource used for transmission. For example, the response information having a high reliability priority is transmitted by using a resource having a large size. The resource here includes the number of PRBs, the number of symbols, and/or the number of resource elements. As a result, the response information having a high reliability priority can be transmitted with a high encoding gain.

Another example of the predetermined transmission method regarding the reliability is a method regarding the signal waveform. For example, the response information having a high reliability priority is transmitted by using a highly reliable signal waveform. The reliability of the signal waveform may be determined in terms of the PAPR. Specifically, the highly reliable signal waveform is the second signal waveform.

Another example of the predetermined transmission method regarding the reliability is a method regarding the type of control channel used for transmission. For example, the response information having a high reliability priority is transmitted on a first control channel, and the response information having a low reliability priority is transmitted on a second control channel. A difference between the first control channel and the second control channel is the number of symbols that can be used for transmission. The first control channel is transmitted by using a resource of four or more symbols, and the second control channel is transmitted by using a resource of one or two symbols. The first control channel is also referred to as a long PUCCH, and the second control channel is also referred to as a short PUCCH. Furthermore, the first control channel may be mapped to any of the slots, and the second control channel may be mapped to only the last of the slots. As a result, the response information having a high reliability priority can increase the size of the resource used for transmission, and can be transmitted with a high encoding gain.

<Multiplexing Number of Response Information in the Present Embodiment>

As described above, in the present embodiment, one or more pieces of the response information can be multiplexed in a certain slot and/or control channel. The multiplexing number may be defined in advance or may be set from the base station. Furthermore, the multiplexing number is the number of pieces of the response information actually multiplexed, and can be determined on the basis of various conditions, parameters, and/or factors.

For example, the multiplexing number of the response information is determined on the basis of at least the maximum multiplexing number of the response information. The maximum multiplexing number of the response information may be defined in advance or may be set from the base station.

As an example of a method of determining the multiplexing number of the response information, the multiplexing number of the response information is the maximum multiplexing number of the response information regardless of actual data reception. At this time, the response information without actual data reception can be DTX.

For example, in a case where the maximum multiplexing number of the response information is set to three, using the example of FIG. 12, multiplexing is considered of the response information in the control channel of the slot #n+3. In a case where data is received in the slot #n+1 and no data is received in the slots #n and #n+2, three pieces of the response information (one ACK or NACK, and two DTXs) are multiplexed in the control channel of the slot #n+3.

Furthermore, in a certain control channel, in a case where all pieces of the response information to be multiplexed are DTX, the control channel does not have to be transmitted.

As another example of the method of determining the multiplexing number of the response information, the multiplexing number of the response information is determined on the basis of the number of pieces of the response information of the data actually received and the maximum multiplexing number of the response information.

In a case where the number of pieces of the response information of the data actually received is equal to or less than the maximum multiplexing number of the response information, the multiplexing number of the response information is the number of pieces of the response information of the data actually received.

In a case where the number of pieces of the response information of the data actually received exceeds the maximum multiplexing number of the response information, the multiplexing number of the response information is set equal to or less than the maximum multiplexing number of the response information. Furthermore, in that case, a method of reducing the number of pieces of the response information of the data actually received to the maximum multiplexing number of the response information can be performed by using various methods.

As an example of the reduction method, bundling may be used of the response information having a low reliability priority. Here, the bundling of the response information is to convert a plurality of pieces of the response information into one response information by logical multiplication, and in a case where all pieces of the response information to be bundled are ACKs, the information becomes ACK.

As an example of the reduction method, the response information having a low reliability priority may be dropped. Here, the drop of the response information is not to transmit the response information. Furthermore, the drop of the response information may be determined, further on the basis of the number of times of repeated transmission. For example, the drop of the response information is preferentially performed on the response information having a large number of times of repeated transmission so far.

Furthermore, in a case where the number of pieces of the response information of the data actually received exceeds the maximum multiplexing number of the response information, transmission may be performed by changing the resource and/or channel for transmitting the response information. In other words, in a case where the number of pieces of the response information of the data actually received is equal to or less than the maximum multiplexing number of the response information (a set predetermined value), those pieces of the response information are transmitted on the second control channel (short PUCCH). In a case where the number of pieces of the response information of the data actually received exceeds the maximum multiplexing number of the response information (the set predetermined value), those pieces of the response information are transmitted on the first control channel (long PUCCH).

Furthermore, the terminal device does not have to assume a case where the number of pieces of the response information of the data actually received exceeds the maximum multiplexing number of the response information. In other words, the base station device performs control (scheduling) on the terminal device so that the number of pieces of the response information of the data actually received does not exceed the maximum multiplexing number of the response information.

<Resource of Control Channel for Transmitting Response Information in the Present Embodiment>

As described above, in the present embodiment, the response information is transmitted on a predetermined control channel or the like. A resource of the control channel used for transmission of the response information is determined by a predetermined method. Here, the resource of the control channel includes a physical resource or a logical resource. The resource of the control channel is determined by any one or a combination of methods described below.

As an example of a method of determining the resource of the control channel, notification of the resource of the control channel is performed by RRC signaling and/or DCI signaling. For example, a plurality of candidates is set by RRC signaling for the resource of the control channel, and DCI signaling performs notification of control information for making a selection from the candidates.

As another example of the method of determining the resource of the control channel, the resource of the control channel is determined on the basis of data corresponding to the response information transmitted on the control channel. For example, information (for example, the first CCE number) is used on the resource of the PDCCH for performing notification of allocation information of the data. Furthermore, in a case where a plurality of pieces of the response information is multiplexed, the resource of the control channel may be determined on the basis of the temporally latest reception data or the reception data having the highest reliability priority.

As another example of the control channel resource determination method, the control channel resource is determined on the basis of the multiplexing number of the response information. For example, in a case where the multiplexing number of the response information is equal to or less than a predetermined value, the resource of the control channel is a first resource, and in a case where the multiplexing number of the response information exceeds the predetermined value, the resource of the control channel is a second resource. The predetermined value may be defined in advance or may be set from the base station. Furthermore, the first resource and the second resource differ from each other in the multiplexing number of the response information that can be transmitted.

<Details of Repeated Transmission of Response Information in the Present Embodiment>

As described above, in the present embodiment, the response information can be repeatedly transmitted. The number of repeated transmissions may be determined on the basis of the reliability priority, as described above. Furthermore, notification of the number of times of repeated transmission may be performed by RRC signaling and/or DCI signaling.

Furthermore, in a case where retransmission of the data is performed while repeated transmission is performed of response information to certain data, the repeated transmission of the response information is stopped after a predetermined slot. The data can be identified by the HARQ process number. The predetermined slot is a slot in which the data is retransmitted, a slot next to the slot in which the data is retransmitted, or a slot after a predetermined number from the slot in which the data is retransmitted.

<Application to Sidelink of Uplink Signal Waveform in the Present Embodiment>

The contents described in the present embodiment can also be applied to the sidelink communication. Reliability of the response information to the data in the sidelink communication of NR can be controlled by the method described in the present embodiment. In other words, in the description of the present embodiment, the uplink can be read as the sidelink.

In addition to the above, reliability control of the response information to the data in the sidelink can be set independently for each predetermined resource pool.

<Terminal Capability Information Regarding Uplink Signal Waveform in the Present Embodiment>

In the present embodiment, the terminal device 2 can notify the base station device 1 of terminal capability information indicating a function or capability of the terminal device 2. The terminal capability information allows the base station device 1 to recognize the function or capability of the terminal device 2, and is used for setting and scheduling of the terminal device 2. For example, the terminal capability information includes information indicating a function or capability regarding the reliability control of the response information to the data.

APPLICATION EXAMPLE

[Application Example of Base Station]

First Application Example

Figure 14:
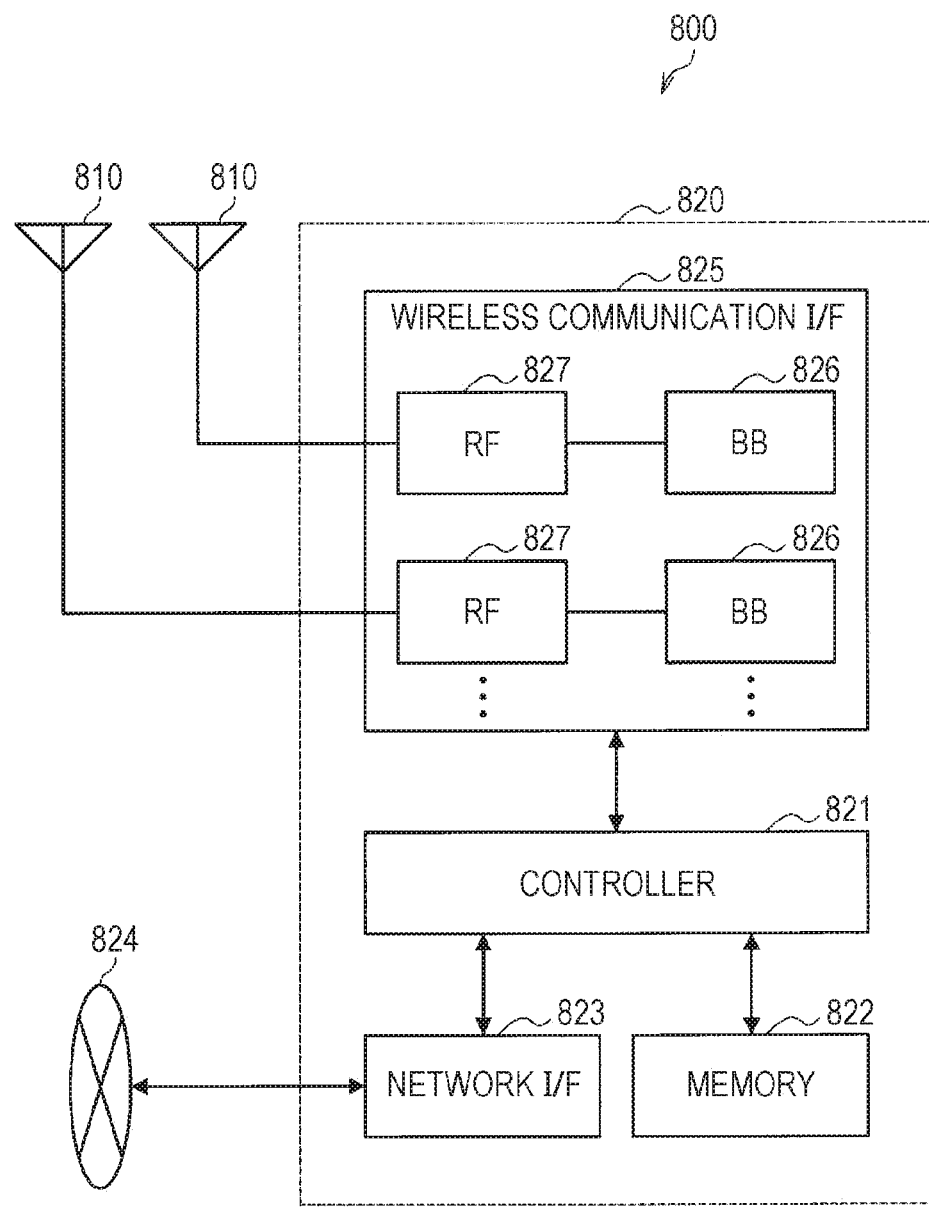
FIG. 14 is a block diagram illustrating a first example of a schematic configuration of an eNB to which a technology according to the present disclosure can be applied.

FIG. 14 is a block diagram illustrating a first example of a schematic configuration of an eNB to which a technology according to the present disclosure can be applied. An eNB 800 includes one or more antennas 810, and a base station device 820. The antennas 810 and the base station device 820 can be connected to each other via RF cables.

Each of the antennas 810 includes a single or a plurality of antenna elements (for example, a plurality of antenna elements constituting a MIMO antenna), and is used for transmission/reception of a wireless signal by the base station device 820. The eNB 800 may include a plurality of the antennas 810 as illustrated in FIG. 14, and the plurality of antennas 810 may respectively correspond to, for example, a plurality of frequency bands used by the eNB 800. Note that, although FIG. 14 illustrates an example in which the eNB 800 includes the plurality of antennas 810, the eNB 800 may include a single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of baseband processors, and transfer the generated bundled packet. Furthermore, the controller 821 may have a logical function of executing control such as radio resource control, radio bearer control, mobility management, admission control, or scheduling. Furthermore, the control may be executed in cooperation with a neighboring eNB or core network node. The memory 822 includes a RAM and a ROM, and stores a program executed by the controller 821, and various control data (for example, terminal list, transmission power data, and scheduling data).

The network interface 823 is a communication interface for connecting the base station device 820 to a core network 824. The controller 821 may communicate with a core network node or another eNB via the network interface 823. In that case, the eNB 800 and the core network node or the other eNB may be connected to each other by a logical interface (for example, an S1 interface or an X2 interface). The network interface 823 may be a wired communication interface, or may be a wireless communication interface for a wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication system such as Long Term Evolution (LTE) or LTE-Advanced, and provides a wireless connection to a terminal located in a cell of the eNB 800 via the antenna 810. The wireless communication interface 825 can typically include a baseband (BB) processor 826 and an RF circuit 827, and the like. The BB processor 826 may perform, for example, encoding/decoding, modulation/demodulation, multiplexing/demultiplexing, and the like, and executes various types of signal processing of each layer (for example, L1, Medium Access Control (MAC), Radio Link Control (RLC), and Packet Data Convergence Protocol (PDCP)). The BB processor 826 may have some or all of the logical functions described above instead of the controller 821. The BB processor 826 may be a module including a memory that stores a communication control program, a processor that executes the program, and a related circuit, and the function of the BB processor 826 may be changeable by update of the program. Furthermore, the module may be a card or a blade inserted into a slot of the base station device 820, or may be a chip mounted on the card or the blade. On the other hand, the RF circuit 827 may include a mixer, a filter, an amplifier, and the like, and transmits and receives the wireless signal via the antenna 810.

The wireless communication interface 825 may include a plurality of the BB processors 826 as illustrated in FIG. 14, and the plurality of BB processors 826 may respectively correspond to, for example, the plurality of frequency bands used by the eNB 800. Furthermore, the wireless communication interface 825 may include a plurality of the RF circuits 827 as illustrated in FIG. 14, and the plurality of RF circuits 827 may respectively correspond to, for example, the plurality of antenna elements. Note that, although FIG. 14 illustrates an example in which the wireless communication interface 825 includes the plurality of BB processors 826 and the plurality of RF circuits 827, the wireless communication interface 825 may include a single BB processor 826 or a single RF circuit 827.

Second Application Example

Figure 15:
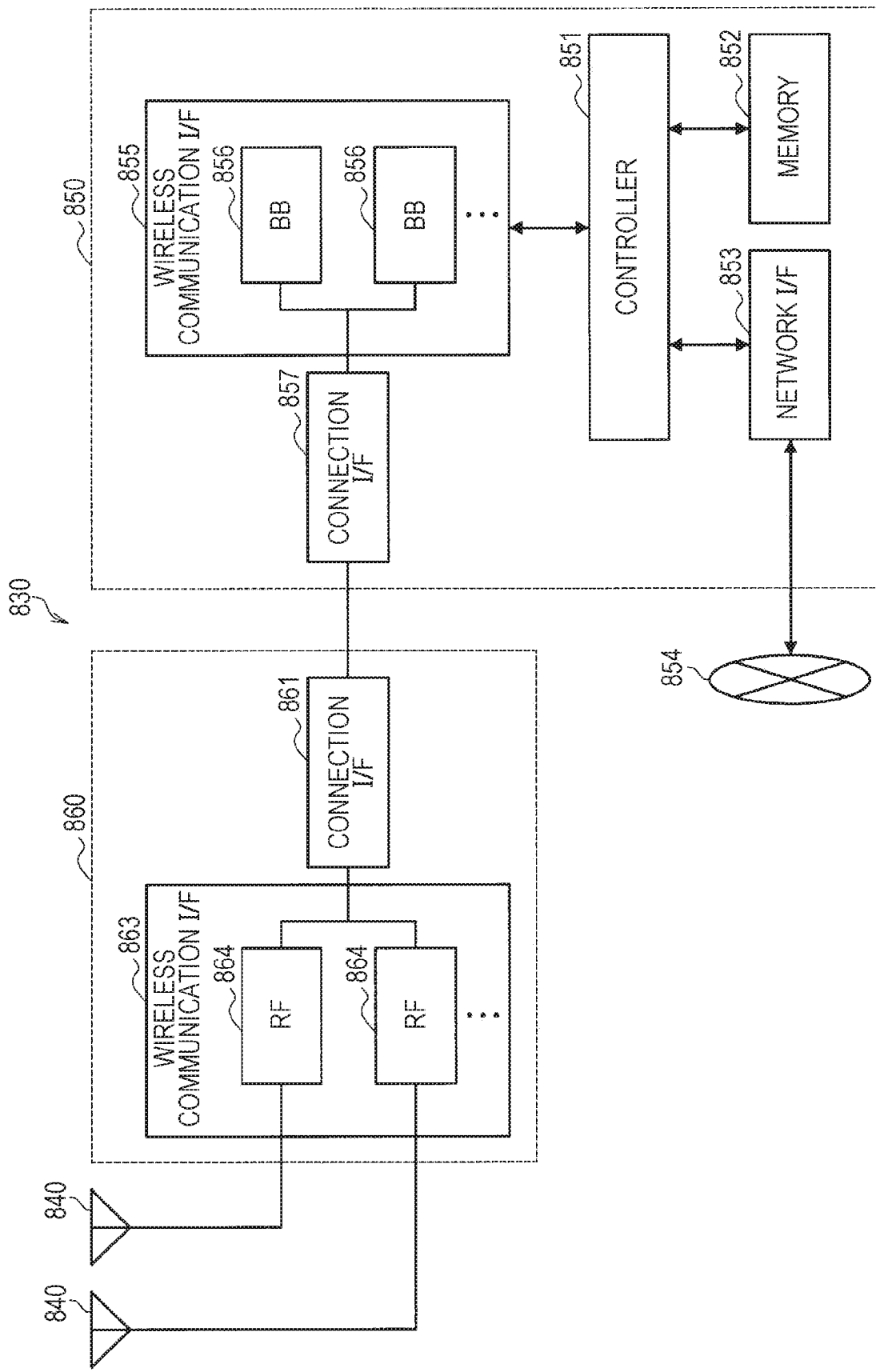
FIG. 15 is a block diagram illustrating a second example of the schematic configuration of the eNB to which the technology according to the present disclosure can be applied.

FIG. 15 is a block diagram illustrating a second example of the schematic configuration of the eNB to which the technology according to the present disclosure can be applied. An eNB 830 includes one or more antennas 840, a base station device 850, and an RRH 860. The antennas 840 and the RRH 860 can be connected to each other via RF cables. Furthermore, the base station device 850 and the RRH 860 can be connected to each other via a high speed line such as an optical fiber cable.

Each of the antennas 840 includes a single or a plurality of antenna elements (for example, a plurality of antenna elements constituting a MIMO antenna), and is used for transmission/reception of a wireless signal by the RRH 860. The eNB 830 may include a plurality of the antennas 840 as illustrated in FIG. 15, and the plurality of antennas 840 may respectively correspond to, for example, a plurality of frequency bands used by the eNB 830. Note that, although FIG. 15 illustrates an example in which the eNB 830 includes the plurality of antennas 840, the eNB 830 may include a single antenna 840.

The base station device 850 includes a controller 851, a memory 852, a network interface 853, a wireless communication interface 855, and a connection interface 857. The controller 851, the memory 852 and the network interface 853 are similar to the controller 821, the memory 822, and the network interface 823 described with reference to FIG. 14.

The wireless communication interface 855 supports any cellular communication system such as LTE or LTE-Advanced, and provides a wireless connection to a terminal located in a sector corresponding to the RRH 860 via the RRH 860 and the antenna 840. The wireless communication interface 855 can typically include a BB processor 856, and the like. The BB processor 856 is similar to the BB processor 826 described with reference to FIG. 14 except that the BB processor 856 is connected to the RF circuit 864 of the RRH 860 via the connection interface 857. The wireless communication interface 855 may include a plurality of the BB processors 856 as illustrated in FIG. 15, and the plurality of BB processors 856 may respectively correspond to, for example, the plurality of frequency bands used by the eNB 830. Note that, although FIG. 15 illustrates an example in which the wireless communication interface 855 includes the plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the high speed line that connects the base station device 850 (wireless communication interface 855) and the RRH 860 to each other.

Furthermore, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives the wireless signal via the antenna 840. The wireless communication interface 863 can typically include the RF circuit 864, and the like. The RF circuit 864 may include a mixer, a filter, an amplifier, and the like, and transmits and receives the wireless signal via the antenna 840. The wireless communication interface 863 may include a plurality of the RF circuits 864 as illustrated in FIG. 15, and the plurality of RF circuits 864 may respectively correspond to, for example, the plurality of antenna elements. Note that, although FIG. 15 illustrates an example in which the wireless communication interface 863 includes the plurality of RF circuits 864, the wireless communication interface 863 may include a single RF circuit 864.

The eNB 800, eNB 830, base station device 820, or base station device 850 illustrated in FIGS. 14 and 15 can correspond to the base station device 1 described with reference to FIG. 8 and the like.

[Application Example of Terminal Device]

First Application Example

Figure 16:
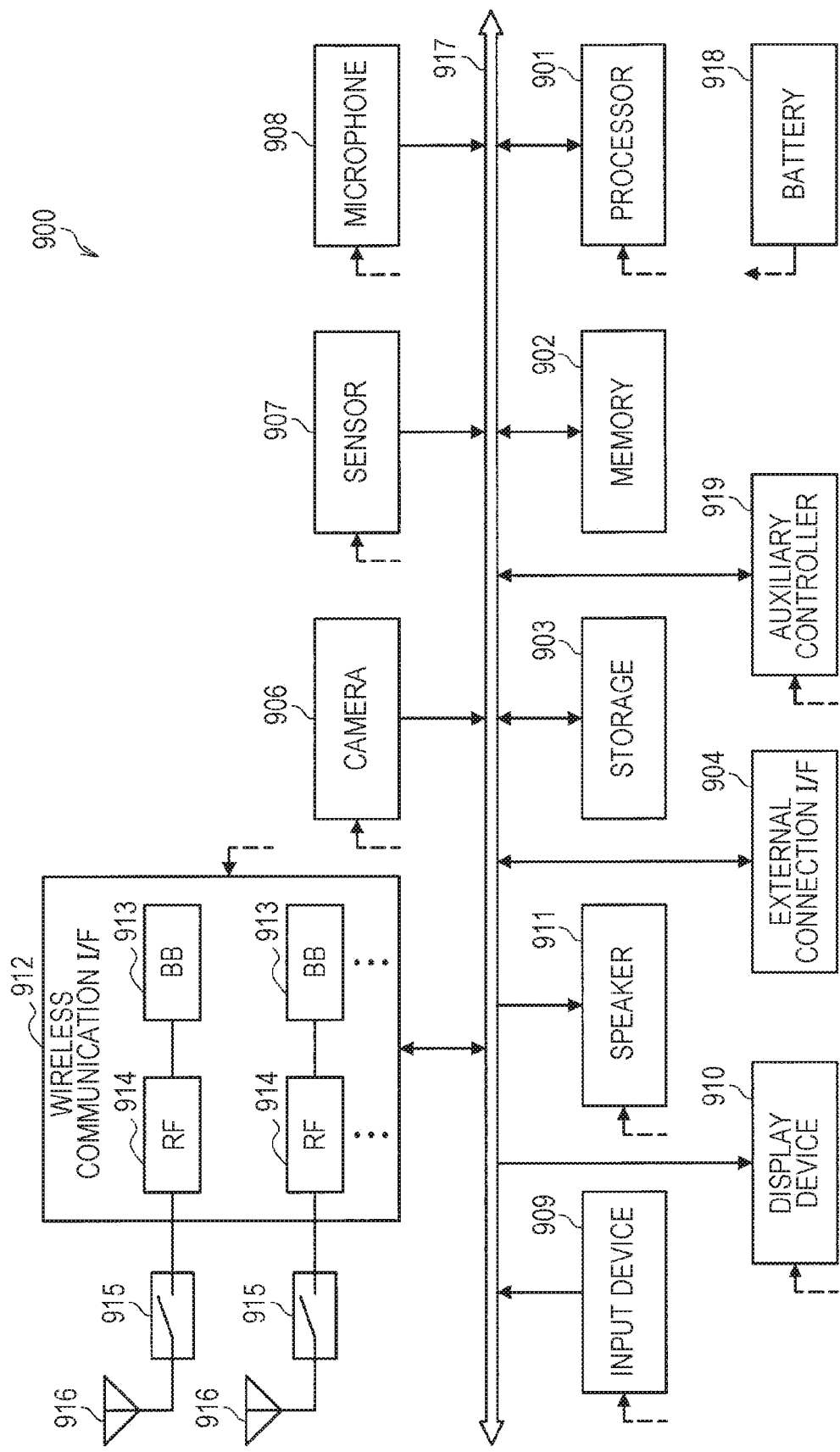
FIG. 16 is a block diagram illustrating an example of a schematic configuration of a smartphone to which the technology according to the present disclosure can be applied.

FIG. 16 is a block diagram illustrating an example of a schematic configuration of a smartphone 900 as the terminal device 2 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a System on Chip (SoC), and controls functions of an application layer and other layers of the smartphone 900. The memory 902 includes a RAM and a ROM, and stores a program executed by the processor 901, and data. The storage 903 can include a storage medium such as a semiconductor memory or a hard disk. The external connection interface 904 is an interface for connecting an external device such as a memory card or a universal serial bus (USB) device to the smartphone 900.

The camera 906 includes, for example, an imaging element such as a charge coupled device (CCD) or a complementary metal oxide semiconductor (CMOS), and generates a captured image. The sensor 907 can include, for example, a sensor group such as a positioning sensor, a gyro sensor, a geomagnetic sensor, and an acceleration sensor. The microphone 908 converts sound input to the smartphone 900 into a sound signal. The input device 909 includes, for example, a touch sensor that detects a touch on a screen of the display device 910, a keypad, a keyboard, a button, a switch, or the like, and accepts operation or information input from a user. The display device 910 includes a screen such as a liquid crystal display (LCD) or an organic light emitting diode (OLED) display, and displays an output image of the smartphone 900. The speaker 911 converts the sound signal output from the smartphone 900 into sound.

The wireless communication interface 912 supports any cellular communication system such as LTE or LTE-Advanced, and executes wireless communication. The wireless communication interface 912 can typically include a BB processor 913, an RF circuit 914, and the like. The BB processor 913 may perform, for example, encoding/decoding, modulation/demodulation, multiplexing/demultiplexing, and the like, and executes various types of signal processing for wireless communication. On the other hand, the RF circuit 914 may include a mixer, a filter, an amplifier, and the like, and transmits and receives a wireless signal through the antenna 916. The wireless communication interface 912 may be a one-chip module in which the BB processor 913 and the RF circuit 914 are integrated together. The wireless communication interface 912 may include a plurality of the BB processors 913 and a plurality of the RF circuits 914 as illustrated in FIG. 16. Note that, although FIG. 16 illustrates an example in which the wireless communication interface 912 includes the plurality of BB processors 913 and the plurality of RF circuits 914, the wireless communication interface 912 may include a single BB processor 913 or a single RF circuit 914.

Moreover, in addition to the cellular communication system, the wireless communication interface 912 may support another type of wireless communication system, such as a near field communication system, a proximity wireless communication system, or a wireless local area network (LAN) system, and in that case, the wireless communication interface 912 may include the BB processor 913 and the RF circuit 914 for each wireless communication system.

Each of the antenna switches 915 switches connection destinations of the antenna 916 among a plurality of circuits (for example, circuits for different wireless communication systems) included in the wireless communication interface 912.

Each of the antennas 916 includes a single or a plurality of antenna elements (for example, a plurality of antenna elements constituting a MIMO antenna), and is used for transmission/reception of a wireless signal by the wireless communication interface 912. The smartphone 900 may include a plurality of the antennas 916 as illustrated in FIG. 16. Note that, although FIG. 16 illustrates an example in which the smartphone 900 includes the plurality of antennas 916, the smartphone 900 may include a single antenna 916.

Moreover, the smartphone 900 may include the antenna 916 for each wireless communication system. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to each block of the smartphone 900 illustrated in FIG. 16 via a feed line partially illustrated by a broken line in the figure. The auxiliary controller 919 operates the minimum necessary functions of the smartphone 900 in the sleep mode, for example.

Second Application Example

Figure 17:
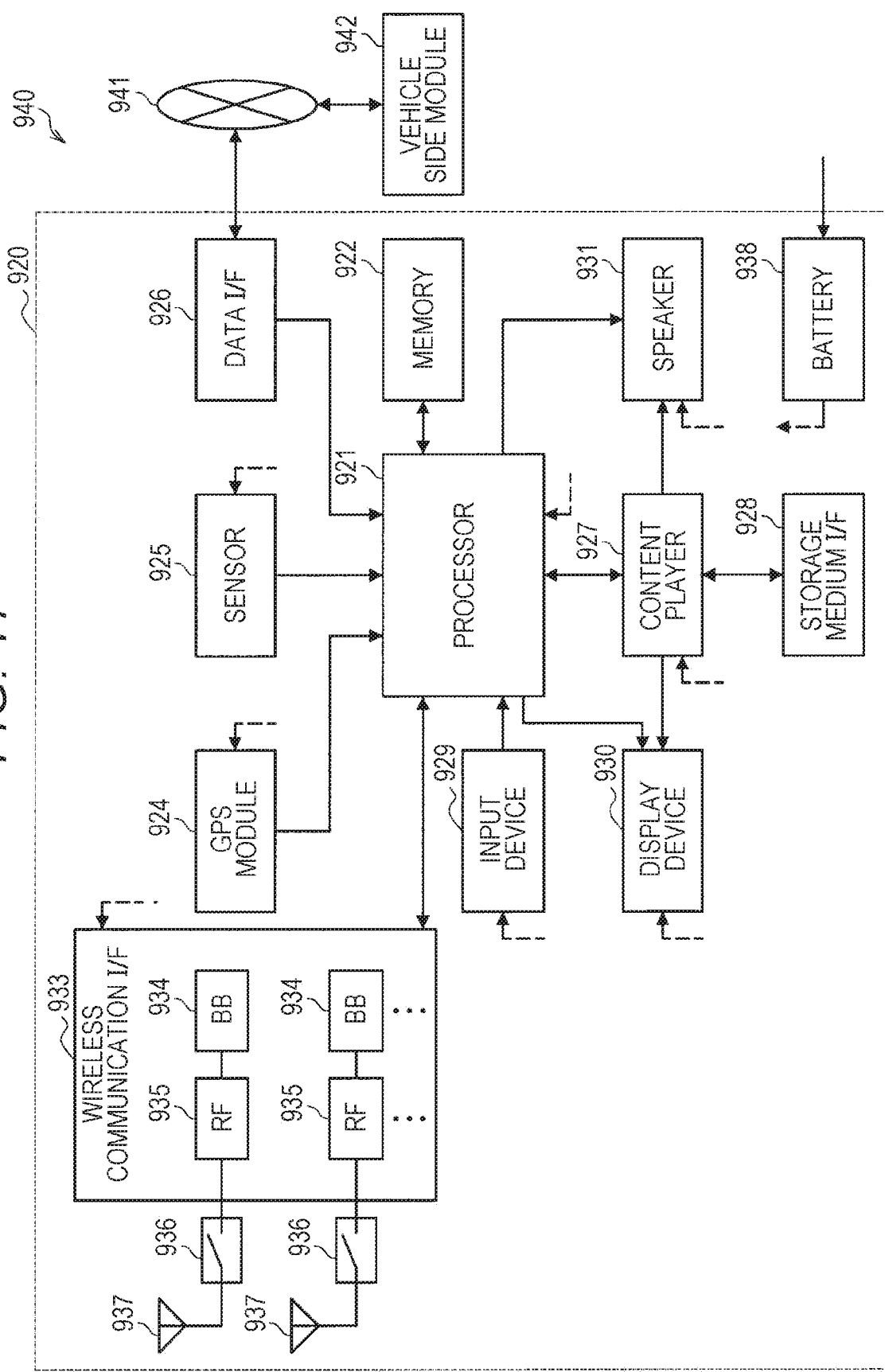
FIG. 17 is a block diagram illustrating an example of a schematic configuration of a car navigation device to which the technology according to the present disclosure can be applied.

FIG. 17 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM, and stores a program executed by the processor 921, and data.

The GPS module 924 uses GPS signals received from GPS satellites to measure a location (for example, latitude, longitude, and altitude) of the car navigation device 920. The sensor 925 can include, for example, a sensor group such as a gyro sensor, a geomagnetic sensor, and an atmospheric pressure sensor. The data interface 926 is connected to an in-vehicle network 941 via a terminal (not illustrated), for example, and acquires data generated on the vehicle side such as vehicle speed data.

The content player 927 reproduces a content stored in a storage medium (for example, CD or DVD) inserted in the storage medium interface 928. The input device 929 includes, for example, a touch sensor that detects a touch on a screen of the display device 930, a button, a switch, or the like, and accepts operation or information input from a user. The display device 930 includes a screen such as an LCD or an OLED display, and displays a navigation function or an image of a content to be reproduced. The speaker 931 outputs sound of the navigation function or the content to be reproduced.

The wireless communication interface 933 supports any cellular communication system such as LTE or LTE-Advanced, and executes wireless communication. The wireless communication interface 933 can typically include a BB processor 934, an RF circuit 935, and the like. The BB processor 934 may perform, for example, encoding/decoding, modulation/demodulation, multiplexing/demultiplexing, and the like, and executes various types of signal processing for wireless communication. On the other hand, the RF circuit 935 may include a mixer, a filter, an amplifier, and the like, and transmits and receives a wireless signal through the antenna 937. The wireless communication interface 933 may be a one-chip module in which the BB processor 934 and the RF circuit 935 are integrated together. The wireless communication interface 933 may include a plurality of the BB processors 934 and a plurality of the RF circuits 935 as illustrated in FIG. 17. Note that, although FIG. 17 illustrates an example in which the wireless communication interface 933 includes the plurality of BB processors 934 and the plurality of RF circuits 935, the wireless communication interface 933 may include a single BB processor 934 or a single RF circuit 935.

Moreover, in addition to the cellular communication system, the wireless communication interface 933 may support another type of wireless communication system, such as a near field communication system, a proximity wireless communication system, or a wireless LAN system, and in that case, the wireless communication interface 933 may include the BB processor 934 and the RF circuit 935 for each wireless communication system.

Each of the antenna switches 936 switches connection destinations of the antenna 937 among a plurality of circuits (for example, circuits for different wireless communication systems) included in the wireless communication interface 933.

Each of the antennas 937 includes a single or a plurality of antenna elements (for example, a plurality of antenna elements constituting a MIMO antenna), and is used for transmission/reception of a wireless signal by the wireless communication interface 933. The car navigation device 920 may include a plurality of the antennas 937 as illustrated in FIG. 17. Note that, although FIG. 17 illustrates an example in which the car navigation device 920 includes the plurality of antennas 937, the car navigation device 920 may include a single antenna 937.

Moreover, the car navigation device 920 may include the antenna 937 for each wireless communication system. In that case, the antenna switch 936 may be omitted from the configuration of the car navigation device 920.

The battery 938 supplies power to each block of the car navigation device 920 illustrated in FIG. 17 via a feed line partially illustrated by a broken line in the figure. Furthermore, the battery 938 accumulates power supplied from the vehicle side.

Furthermore, the technology according to the present disclosure may be implemented as an in-vehicle system (or vehicle) 940 including: one or more blocks of the car navigation device 920; the in-vehicle network 941; and a vehicle-side module 942. The vehicle-side module 942 generates vehicle side data such as vehicle speed, engine speed, or failure information, and outputs the generated data to the in-vehicle network 941.

Note that, the effects described in the present description are merely illustrative or exemplary and not restrictive. That is, the technology according to the present disclosure can exhibit other effects obvious to those skilled in the art from the description of the present description together with the above-described effects or in place of the above-described effects.

Note that, the following configurations also belong to the technical scope of the present disclosure.

(1)

A terminal device that communicates with a base station device, the terminal device including:

a reception unit that receives a data channel including one or more pieces of data; and a transmission unit that transmits response information to the data on the basis of a parameter regarding reliability of the data.

(2)

The terminal device according to (1), in which the response information is repeatedly transmitted on a predetermined number of different control channels.

(3)

The terminal device according to (2), in which the predetermined number is determined on the basis of the parameter regarding the reliability.

(4)

The terminal device according to (2) or (3), in which repeated transmission of the response information is stopped in a case where retransmission of the data is received.

(5)

The terminal device according to any one of (2) to (4), in which a plurality of pieces of the response information for different pieces of the data are multiplexed and transmitted in each of the control channels.

(6)

The terminal device according to (5), in which the number of the plurality of pieces of response information is determined on the basis of the maximum multiplexing number set from at least the base station device.

(7)

The terminal device according to (5), in which the control channels are determined on the basis of the number of the plurality of pieces of response information.

(8)

The terminal device according to any one of (1) to (7), in which the parameter regarding the reliability is given by at least a reception timing of the data.

(9)

The terminal device according to any one of (1) to (7), in which the parameter regarding the reliability is given by at least a transmission timing of the response information to reception of the data.

(10)

The terminal device according to any one of (1) to (7), in which the parameter regarding the reliability is given by at least the number of times of repeated transmission of the response information.

(11)

The terminal device according to any one of (1) to (7), in which the parameter regarding the reliability is given by at least control information for the data channel.

(12)

The terminal device according to any one of (1) to (11), in which the parameter regarding the reliability controls an encoding rate of the response information.

(13)

The terminal device according to any one of (1) to (11), in which the parameter regarding the reliability controls a size of a resource used for transmission of the response information.

(14)

A base station device that communicates with a terminal device, the base station device including:

a transmission unit that transmits a data channel including one or more pieces of data; and a reception unit that receives response information to the data on the basis of a parameter regarding reliability of the data.

(15)

A communication method used by a terminal device that communicates with a base station device, the communication method including:

receiving a data channel including one or more pieces of data; and transmitting response information to the data on the basis of a parameter regarding reliability of the data.

(16)

A communication method used by a base station device that communicates with a terminal device, the communication method including:

transmitting a data channel including one or more pieces of data; and receiving response information to the data on the basis of a parameter regarding reliability of the data.

(17)

A recording medium that records a program for causing a computer to function as:

a reception unit that receives a data channel including one or more pieces of data; and a transmission unit that transmits response information to the data on the basis of a parameter regarding reliability of the data.

(18)

A recording medium that records a program for causing a computer to function as:

a transmission unit that transmits a data channel including one or more pieces of data; and a reception unit that receives response information to the data on the basis of a parameter regarding reliability of the data.

REFERENCE SIGNS LIST

1 Base station device
101 Upper layer processing unit
103 Control unit
105 Reception unit
107 Transmission unit
2 Terminal device
201 Upper layer processing unit
203 Control unit
205 Reception unit
207 Transmission unit

The invention claimed is:

1. A terminal device that communicates with a base station device, the terminal device comprising:

a receiver that receives, from the base station device:
a downlink control channel including scheduling information and priority information, and
a downlink data channel based on the scheduling information, the downlink data channel including first data in a first slot of the downlink data channel and having a first priority indicated by the priority information and second data in a second slot of the downlink data channel and having a second priority indicated by the priority information; and a transmitter that transmits, to the base station device:
in response to the first data, first response data via a first slot of an uplink control channel, and that corresponds to the first slot of the downlink data channel, and
in response to the second data, second response data via a second slot of the uplink control channel different from the first slot of the uplink control channel, and that corresponds to the second slot of the downlink data channel, wherein, based on the priority information indicating the first priority, the first response information is repeated a first number of times in slots of the uplink control channel following the first slot of the uplink control channel, wherein, based on the priority information indicating the second priority, the second response information is repeated a second number of times in slots of the uplink control channel following the second slot of the uplink control channel, and wherein the first response data and the second response data are multiplexed when they are transmitted in a common slot in the uplink control channel.

2. The terminal device according to claim 1, wherein any repeated transmission of the first or second response information is stopped in a case where a retransmission, by the base station device, of a respective one of the first or second data is received by the terminal device.

3. The terminal device according to claim 1, wherein the response data comprises HARQ-ACK/NACK data.

4. The terminal device according to claim 1, wherein:
the first number of times corresponding to the first priority and the second number of times corresponding to the second priority are notified by RRC signaling,
a correspondence between the first slot of the uplink control channel and the first slot of the downlink data channel is notified by the RRC signaling, and
a correspondence between the second slot of the uplink control channel and the second slot of the downlink data channel is notified by the RRC signaling.

5. The terminal device according to claim 1, wherein the downlink control channel further indicates at least one of a first number of symbols used for the first uplink control channel or a second number of symbols used for the second uplink control channel.

6. The terminal device according to claim 1, wherein the downlink control channel further indicates at least one of a first modulation type for the first uplink control channel or a second modulation type for the second uplink control channel.

7. The terminal device according to claim 1, wherein the downlink control channel further indicates at least one of a first size of a resource used for the first uplink control channel or a second size of a resource used for the second uplink control channel.

8. A base station device that communicates with a terminal device, the base station device comprising:

a transmitter that transmits, to the terminal device:
a downlink control channel including scheduling information and priority information, and
a downlink data channel based on the scheduling information, the downlink data channel including first data in a first slot of the downlink data channel and having a first priority indicated by the priority information and second data in a second slot of the downlink data channel and having a second priority indicated by the priority information; and a receiver that receives, from the terminal device:
in response to the first data, first response data via a first slot of an uplink control channel, and that corresponds to the first slot of the downlink data channel, and
in response to the second data, second response data via a second slot of the uplink control channel different from the first slot of the uplink control channel, and that corresponds to the second slot of the downlink data channel, wherein, based on the priority information indicating the first priority, the first response information is repeated a first number of times in slots of the uplink control channel following the first slot of the uplink control channel, wherein, based on the priority information indicating the second priority, the second response information is repeated a second number of times in slots of the uplink control channel following the second slot of the uplink control channel, and wherein the first response data and the second response data are multiplexed when they are transmitted in a common slot in the uplink control channel.

9. A communication method used by a terminal device that communicates with a base station device, the communication method comprising:

receiving, from the base station device:
 a downlink control channel including scheduling information and priority information, and
 a downlink data channel based on the scheduling information, the downlink data channel including first data in a first slot of the downlink data channel and having a first priority indicated by the priority information and second data in a second slot of the downlink data channel and having a second priority indicated by the priority information; and transmitting, to the base station device:
 in response to the first data, first response data via a first slot of an uplink control channel, and that corresponds to the first slot of the downlink data channel, and
 in response to the second data, second response data via a second slot of the uplink control channel different from the first slot of the uplink control channel, and that corresponds to the second slot of the downlink data channel,
 wherein, based on the priority information indicating the first priority, the first response information is repeated a first number of times in slots of the uplink control channel following the first slot of the uplink control channel,
 wherein, based on the priority information indicating the second priority, the second response information is repeated a second number of times in slots of the uplink control channel following the second slot of the uplink control channel, and
 wherein the first response data and the second response data are multiplexed when they are transmitted in a common slot in the uplink control channel.

10. A communication method used by a base station device that communicates with a terminal device, the communication method comprising:

transmitting, to the terminal device:
 a downlink control channel including scheduling information and priority information, and
 a downlink data channel based on the scheduling information, the downlink data channel including first data in a first slot of the downlink data channel and having a first priority indicated by the priority information and second data in a second slot of the downlink data channel and having a second priority indicated by the priority information; and receiving, from the terminal device:
 in response to the first data, first response data via a first slot of an uplink control channel, and that corresponds to the first slot of the downlink data channel, and
 in response to the second data, second response data via a second slot of the uplink control channel different from the first slot of the uplink control channel, and that corresponds to the second slot of the downlink data channel,
 wherein, based on the priority information indicating the first priority, the first response information is repeated a first number of times in slots of the uplink control channel following the first slot of the uplink control channel,
 wherein, based on the priority information indicating the second priority, the second response information is repeated a second number of times in slots of the uplink control channel following the second slot of the uplink control channel, and
 wherein the first response data and the second response data are multiplexed when they are transmitted in a common slot in the uplink control channel.

11. A tangible, non-transitory recording medium that contains a computer-readable program for causing a terminal device to perform a communication method with a base station device, the communication method comprising:

receiving, from the base station device:
 a downlink control channel including scheduling information and priority information, and
 a downlink data channel based on the scheduling information, the downlink data channel including first data in a first slot of the downlink data channel and having a first priority indicated by the priority information and second data in a second slot of the downlink data channel and having a second priority indicated by the priority information; and transmitting, to the base station device:
 in response to the first data, first response data via a first slot of an uplink control channel, and that corresponds to the first slot of the downlink data channel, and
 in response to the second data, second response data via a second slot of the uplink control channel different from the first slot of the uplink control channel, and that corresponds to the second slot of the downlink data channel,
 wherein, based on the priority information indicating the first priority, the first response information is repeated a first number of times in slots of the uplink control channel following the first slot of the uplink control channel,
 wherein, based on the priority information indicating the second priority, the second response information is repeated a second number of times in slots of the uplink control channel following the second slot of the uplink control channel, and
 wherein the first response data and the second response data are multiplexed when they are transmitted in a common slot in the uplink control channel.

12. A tangible, non-transitory recording medium that contains a computer-readable program for causing a base station device to perform a communication method with a terminal device, the communication method comprising:

transmitting, to the terminal device:
 a downlink control channel including scheduling information and priority information, and
 a downlink data channel based on the scheduling information, the downlink data channel including first data in a first slot of the downlink data channel and having a first priority indicated by the priority information and second data in a second slot of the downlink data channel and having a second priority indicated by the priority information; and receiving, from the terminal device:
 in response to the first data, first response data via a first slot of an uplink control channel, and that corresponds to the first slot of the downlink data channel, and in response to the second data, second response data via a second slot of the uplink control channel different from the first slot of the uplink control channel, and that corresponds to the second slot of the downlink data channel, wherein, based on the priority information indicating the first priority, the first response information is repeated a first number of times in slots of the uplink control channel following the first slot of the uplink control channel, wherein, based on the priority information indicating the second priority, the second response information is repeated a second number of times in slots of the uplink control channel following the second slot of the uplink control channel, and wherein the first response data and the second response data are multiplexed when they are transmitted in a common slot in the uplink control channel.

* * * * *